Sept. 19, 1967

D. L. MALONEY ET AL 3,342,100

MICROFILM RECORDER

Filed Sept. 14, 1964

INVENTORS.
David L. Maloney
Paul G. Bielik
Louis A. Smitzer

By

Attys

Sept. 19, 1967   D. L. MALONEY ET AL   3,342,100

MICROFILM RECORDER

Filed Sept. 14, 1964   14 Sheets-Sheet 2

INVENTORS.
David L. Maloney
Paul G. Bielik
Louis A. Smitzer.

By
Attys.

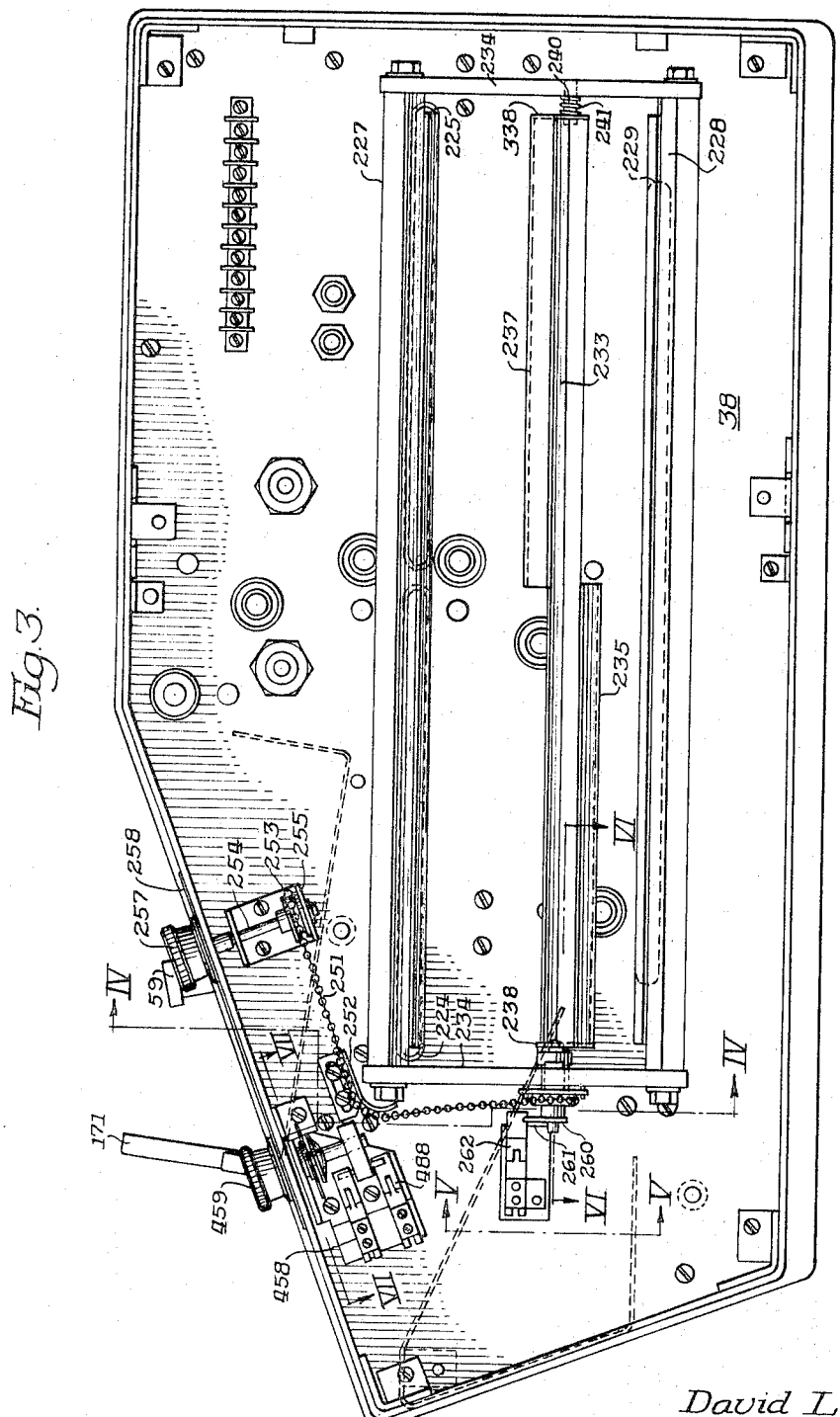

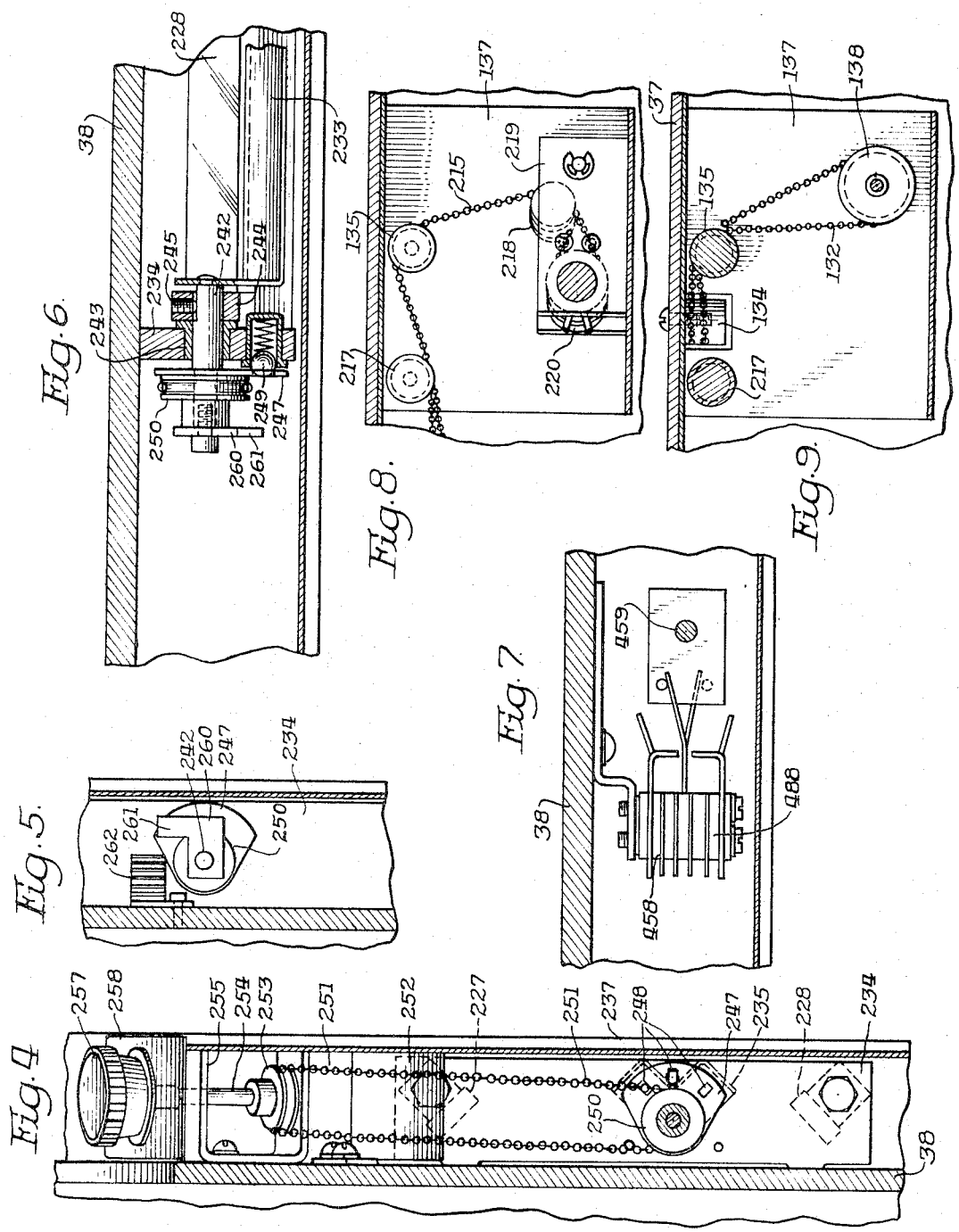

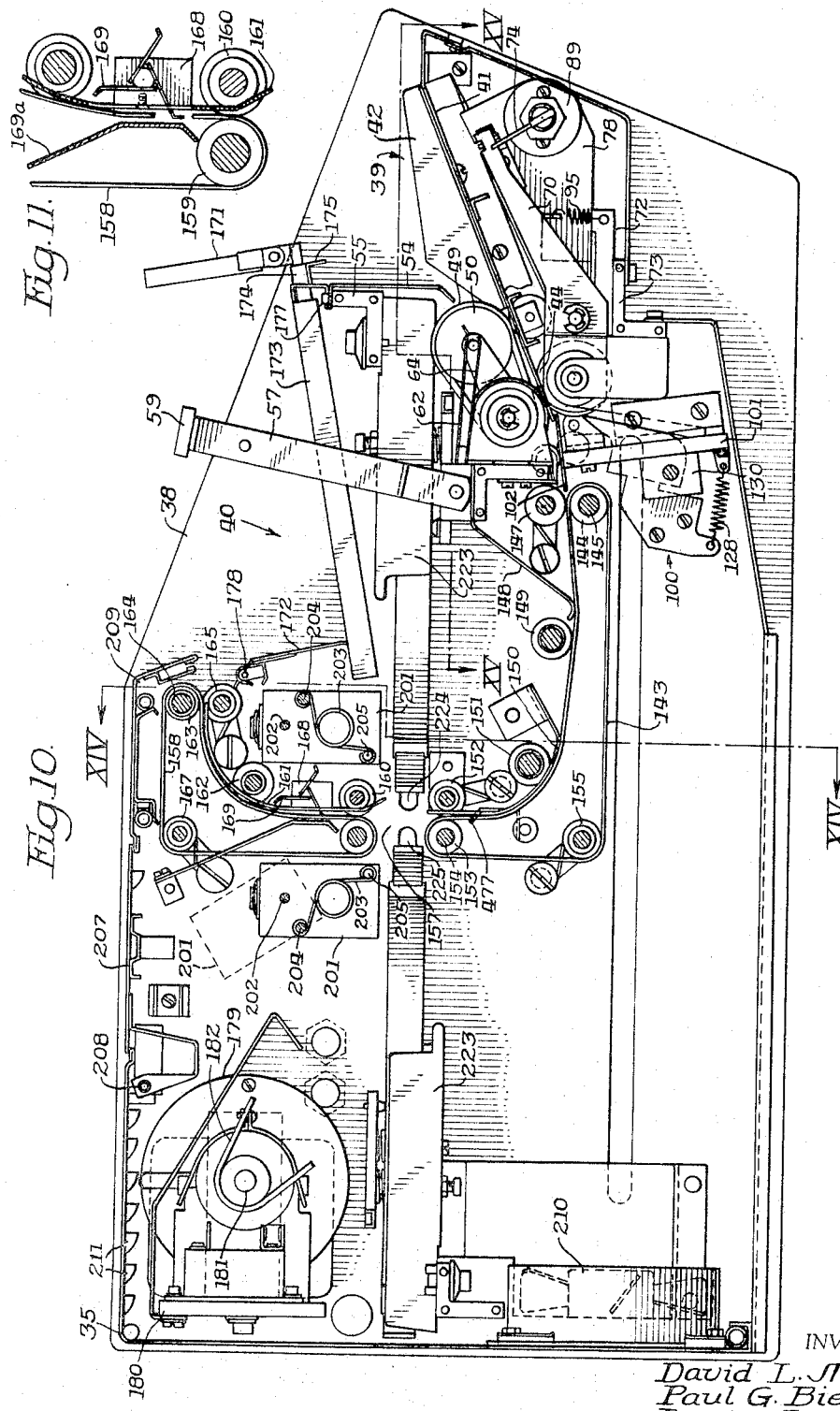

Sept. 19, 1967    D. L. MALONEY ET AL    3,342,100
MICROFILM RECORDER
Filed Sept. 14, 1964    14 Sheets-Sheet 6
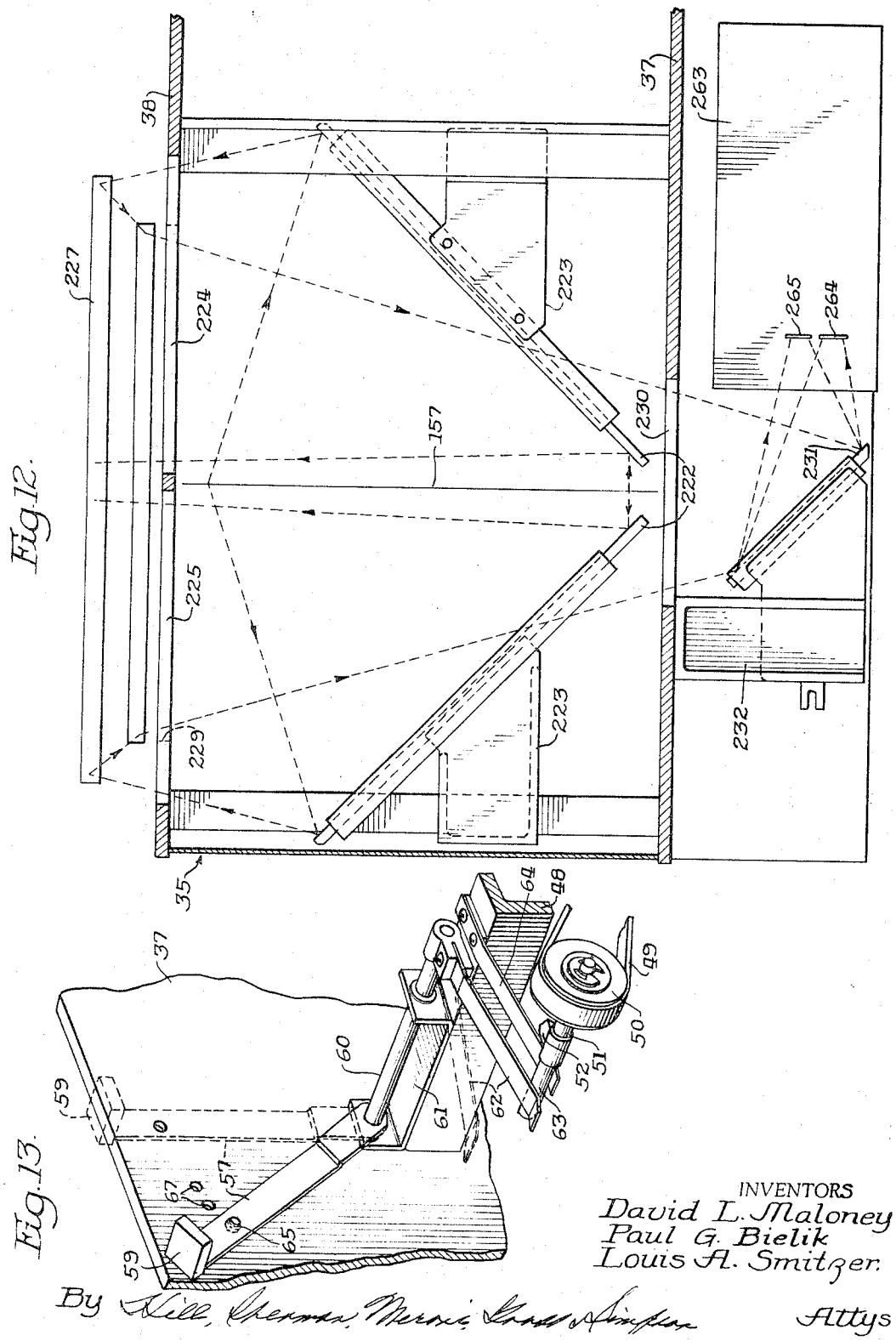
INVENTORS
David L. Maloney
Paul G. Bielik
Louis A. Smitzer
By Hill, Sherman, Meroni, Gross & Simpson
Attys

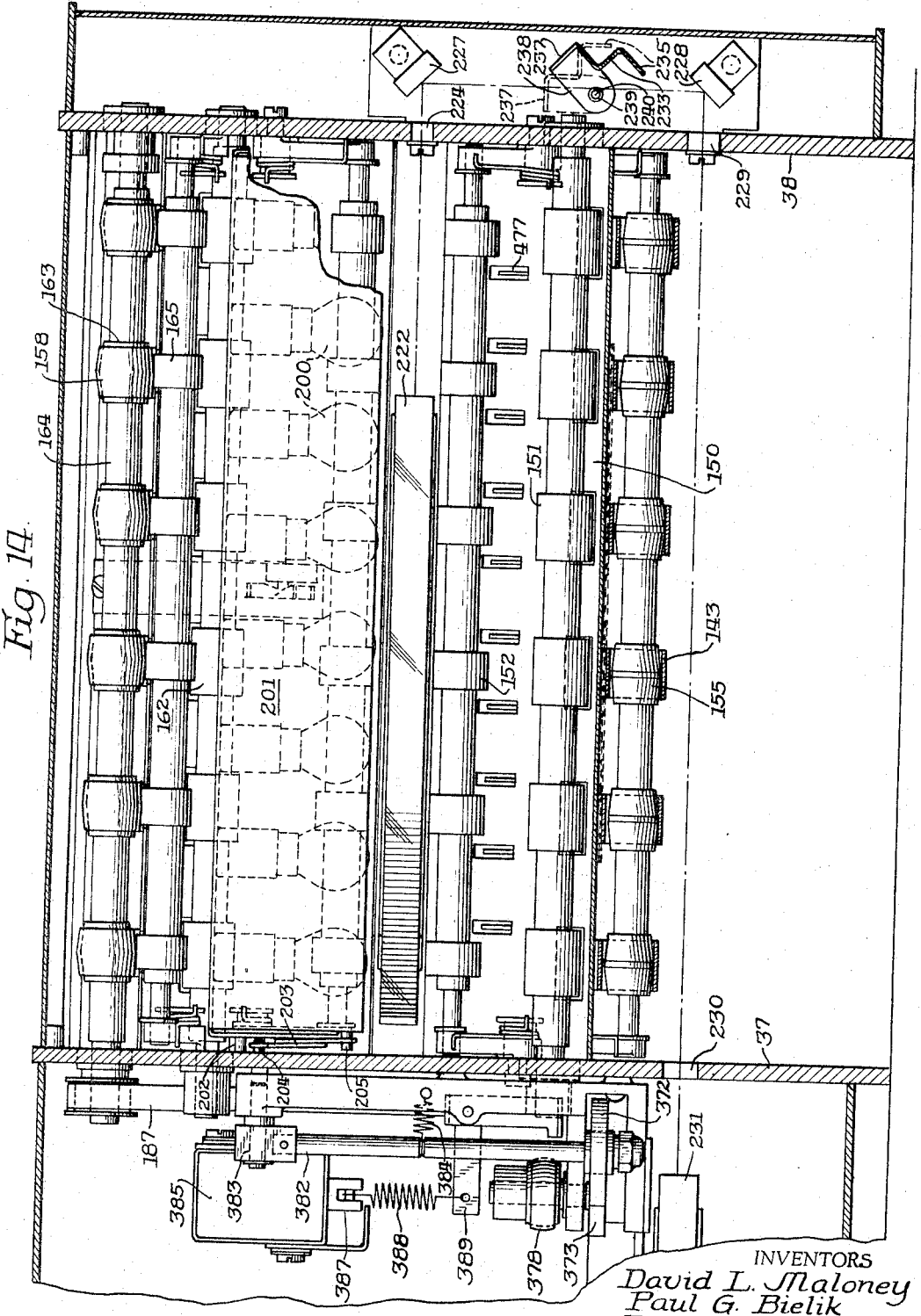

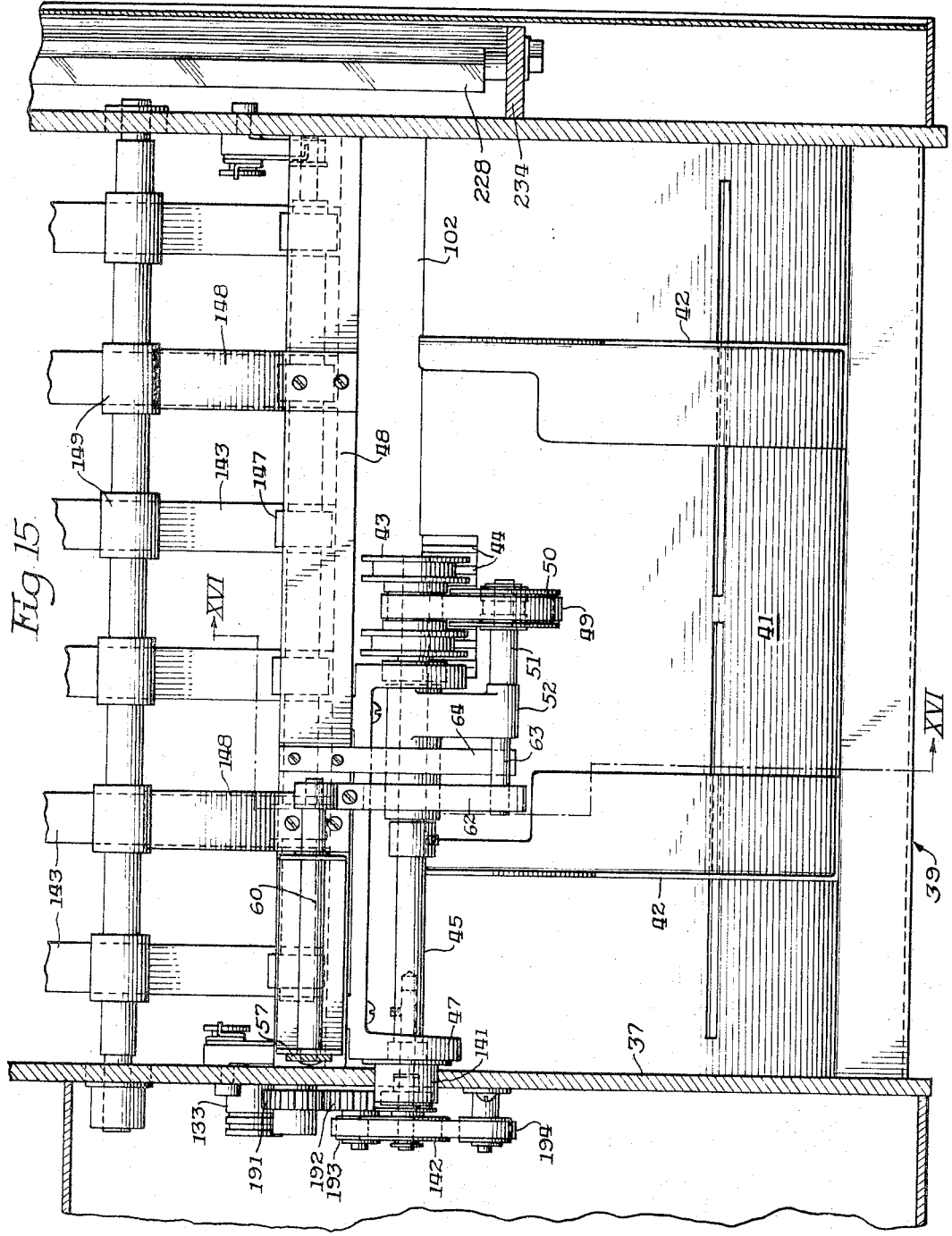

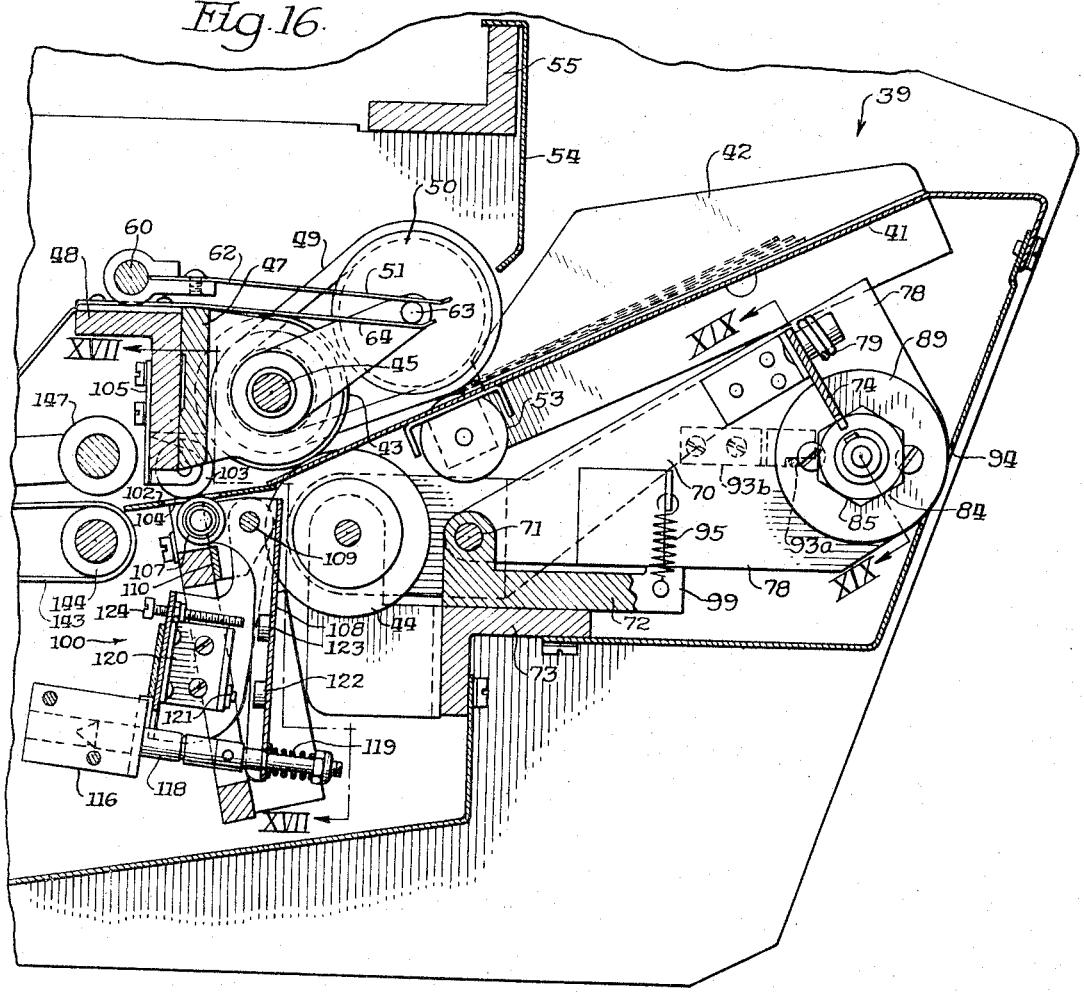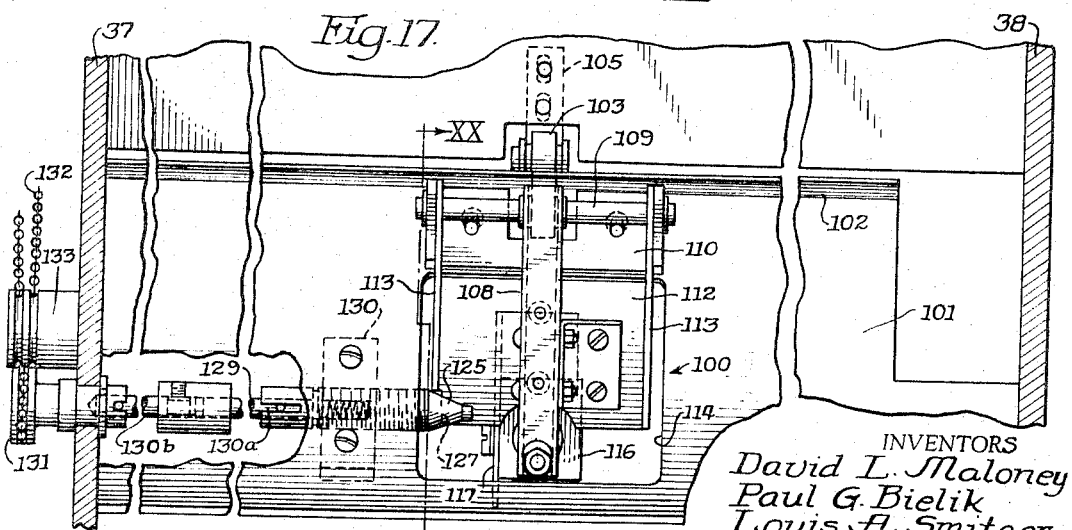

Sept. 19, 1967　　　D. L. MALONEY ET AL　　　3,342,100
MICROFILM RECORDER

Filed Sept. 14, 1964　　　　　　　　　　　　14 Sheets-Sheet 10

INVENTORS.
David L. Maloney
Paul G. Bielik
Louis A. Smitzer

By Hill, Sherman, Meroni, Gross & Simpson

Attys

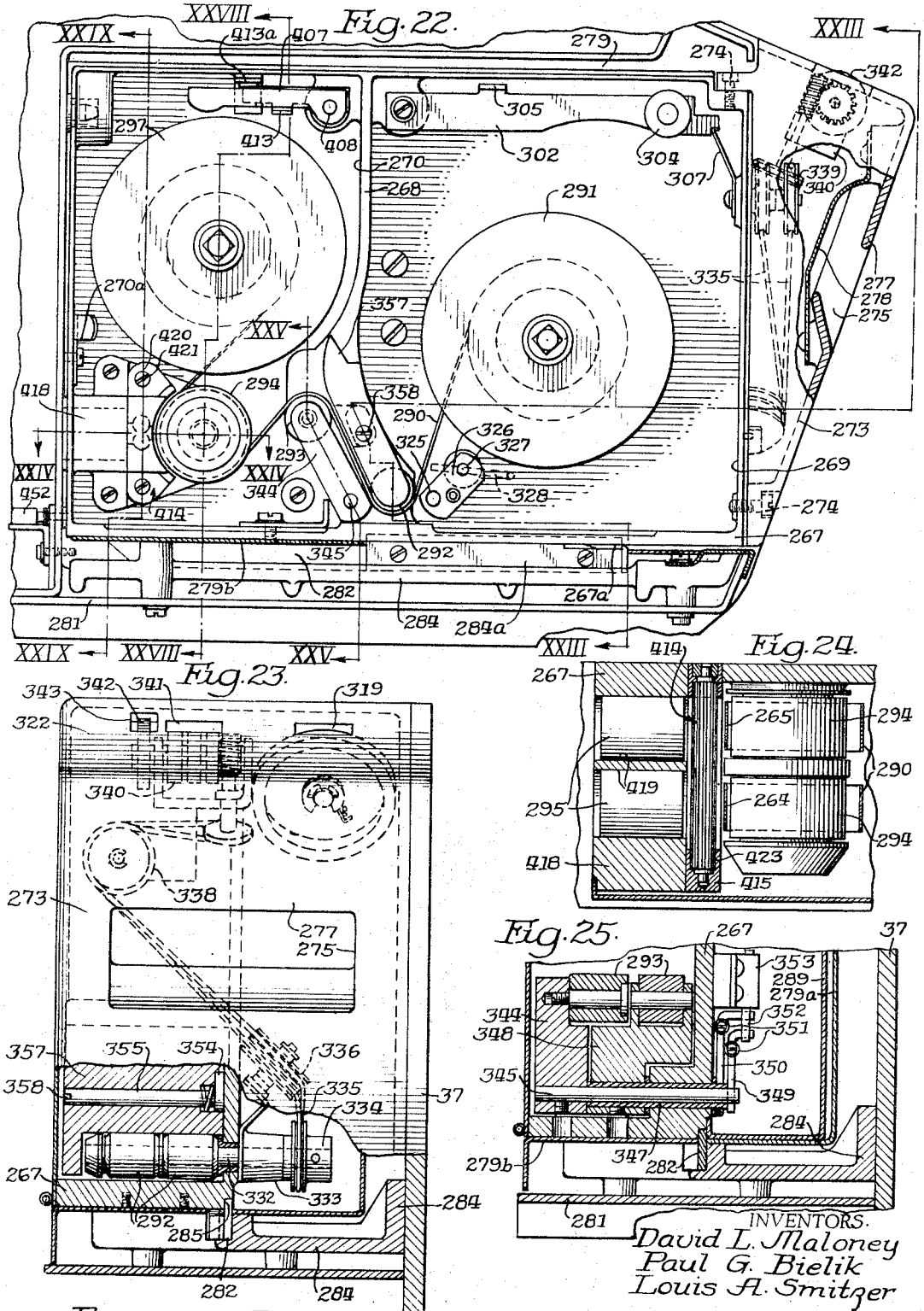

Sept. 19, 1967    D. L. MALONEY ET AL    3,342,100
MICROFILM RECORDER
Filed Sept. 14, 1964    14 Sheets-Sheet 12

INVENTORS
David L. Maloney
Paul G. Bielik
Louis A. Smitzer

By Hill, Sherman, Meroni, Gross & Simpson

Attys

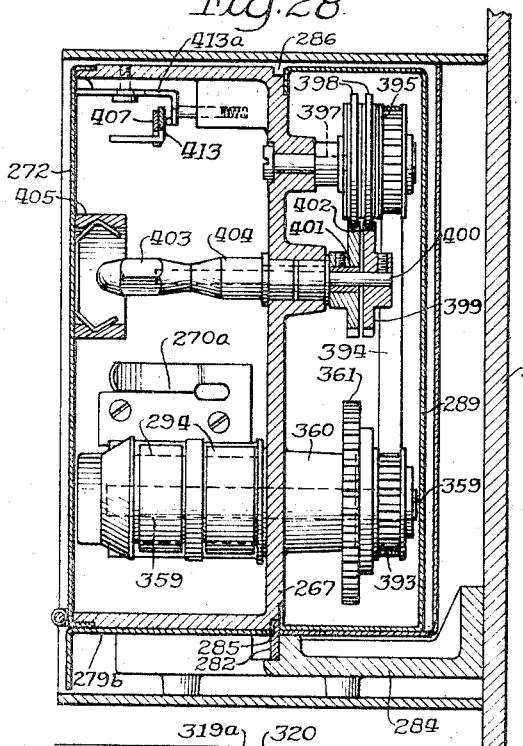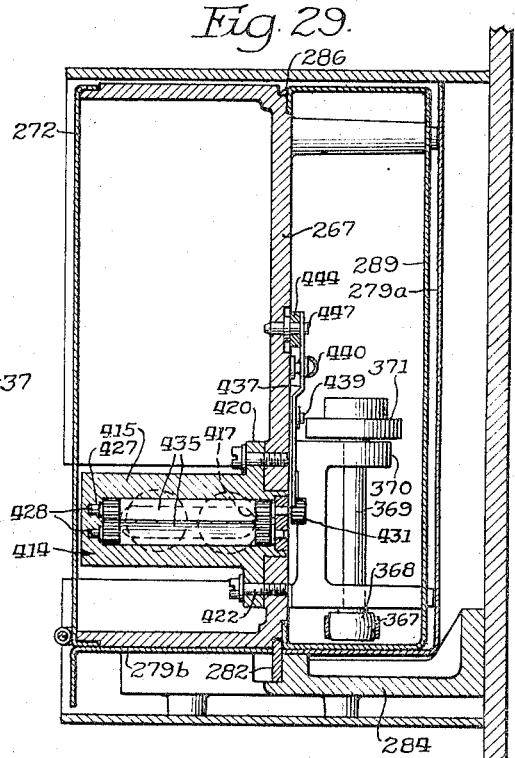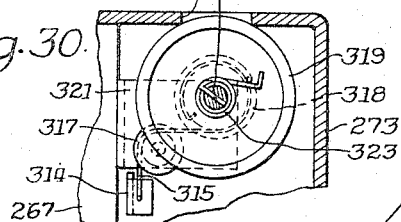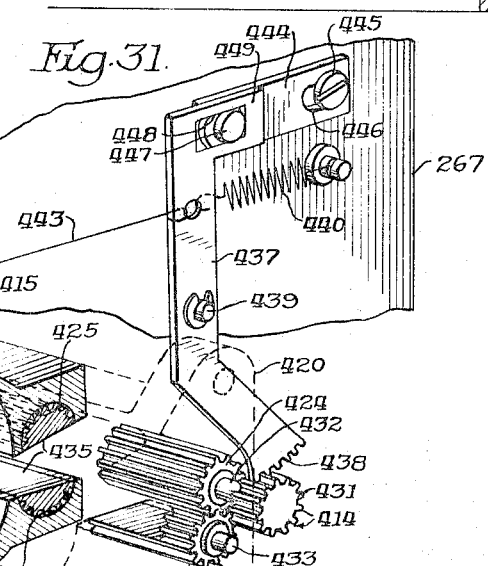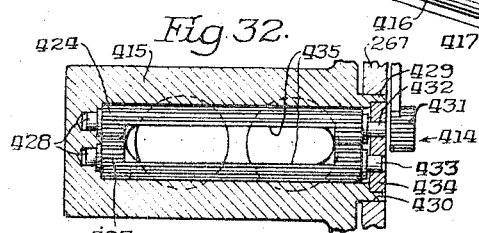

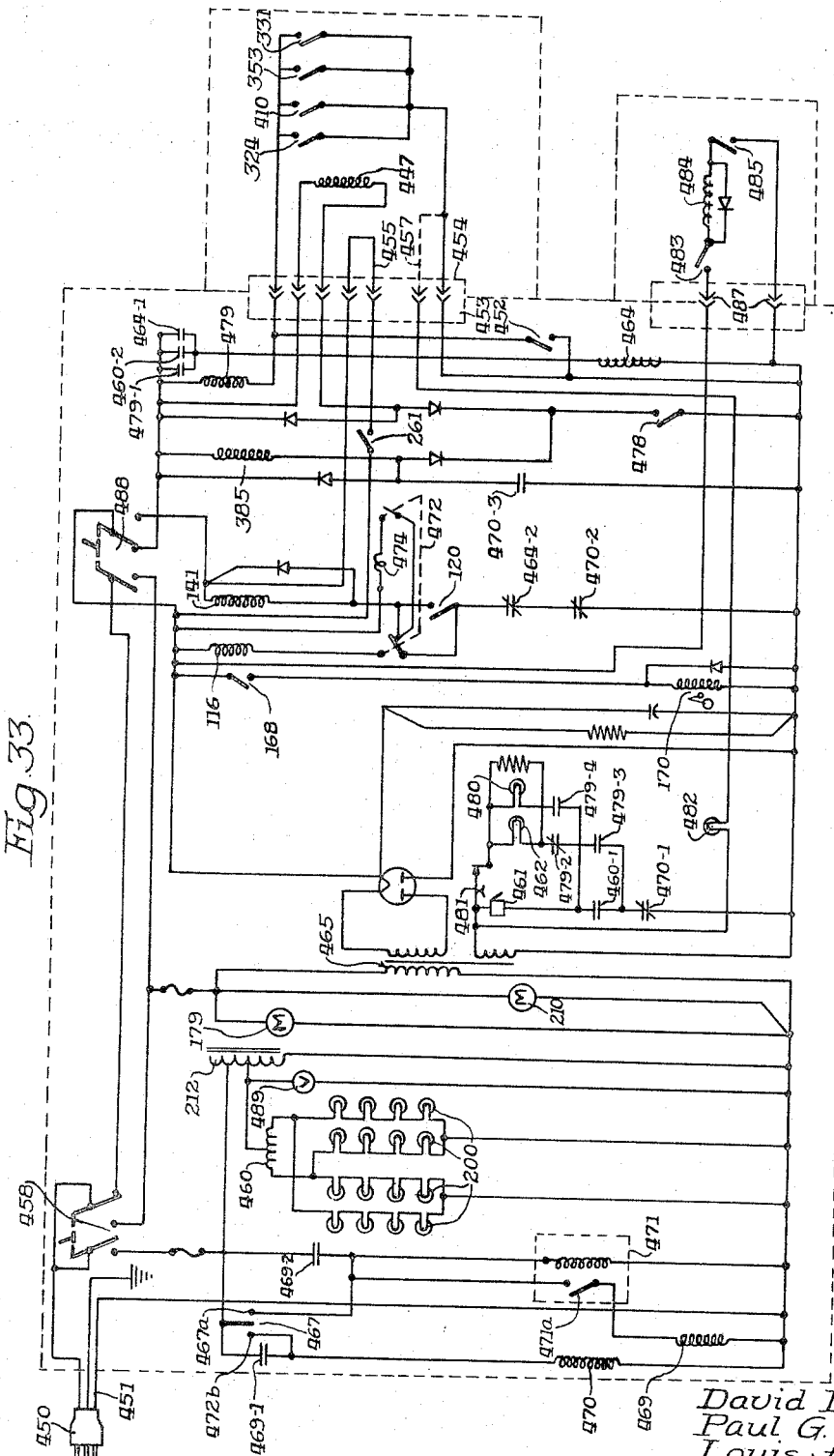

United States Patent Office 3,342,100
Patented Sept. 19, 1967

3,342,100
MICROFILM RECORDER
David L. Maloney, Evanston, Paul G. Bielik, North Riverside, and Louis A. Smitzer, Chicago, Ill., assignors to Bell & Howell Company, Chicago, Ill., a corporation of Illinois
Filed Sept. 14, 1964, Ser. No. 396,017
58 Claims. (Cl. 88—24)

This invention relates to improvements in microfilm recorders and is more particularly concerned with a document photographing machine for recording at high speed blank checks, letters, statements, and other documents which it is desired to photograph on microfilm.

Machines of this general type are known, and it is the principal aim of the present invention to provide substantial improvements as to compactness, convenience, efficiency, and performance capabilities in machines of this type.

An important object of the present invention is to provide improvements in microfilm recorders conveniently embodied in a table model machine.

Another object of the invention is to provide a new and improved high speed microfilm recorder having a compact and efficient assembly of operating components and subassemblies.

A further object of the invention is to provide a new and improved microfilm recorder having novel adjustment and control means affording ease of adjustment and facilitating attainment of various performance attributes of the machine.

Still another object of the invention is to provide new and improved document feeding mechanism for the machine.

Yet another object of the invention is to provide an improved document feeding control for the assembly.

A still further object of the invention is to provide new and improved image selection means in the optical path of the machine.

A yet further object of the invention is to provide improved quickly replaceable camera construction and driving and mounting means therefor in a microfilm recorder.

It is also an object of the invention to provide new and improved means for quick reduction ratio interchangeability in a microfilm recorder.

Other objects, features and advantages of the present invention will be readily apparent from the following detailed description of a preferred embodiment thereof taken in conjunction with the accompanying drawings, in which:

FIGURE 1A is an enlarged plan view of the voltmeter of the illumination control system of the machine;

FIGURE 1B is a similar plan view, partially in section and with the film speed scale removed;

FIGURE 3 is a right side elevational view of the machine with the housing side plate removed;

FIGURE 4 is an enlarged fragmentary vertical sectional elevational detail view taken substantially on the line IV—IV of FIGURE 3;

FIGURE 5 is an enlarged fragmentary vertical sectional elevational detail view taken substantially on the line V—V of FIGURE 3;

FIGURE 6 is a fragmentary enlarged sectional plan view taken substantially on the line VI—VI of FIGURE 3;

FIGURE 7 is an enlarged fragmentary sectional plan view taken substantially on the line VII—VII of FIGURE 3;

FIGURE 8 is a fragmentary sectional plan view taken substantially on the line VIII—VIII of FIGURE 2;

FIGURE 9 is a fragmentary sectional plan view taken substantially on the line IX—IX of FIGURE 2;

FIGURE 10 is an elevational view looking inwardly from the left side frame plate substantially in the plane of the section line X—X of FIGURE 1;

FIGURE 11 is a fragmentary enlarged elevational view showing the document counting detector switch;

FIGURE 12 is a schematic sectional plan view showing the optical path of the machine;

FIGURE 13 is a fragmentary sectional isometric view showing the document pull-in belt control device;

FIGURE 14 is an enlarged sectional elevational view taken substantially on the line XIV—XIV of FIGURE 10;

FIGURE 15 is an enlarged fragmentary sectional elevational view taken substantially on the line XV—XV of FIGURE 10;

FIGURE 16 is a fragmentary sectional elevational detail view taken substantially on the line XVI—XVI of FIGURE 15;

FIGURE 17 is a fragmental sectional elevational detail view taken substantially on the line XVII—XVII of FIGURE 16;

Figure 26:
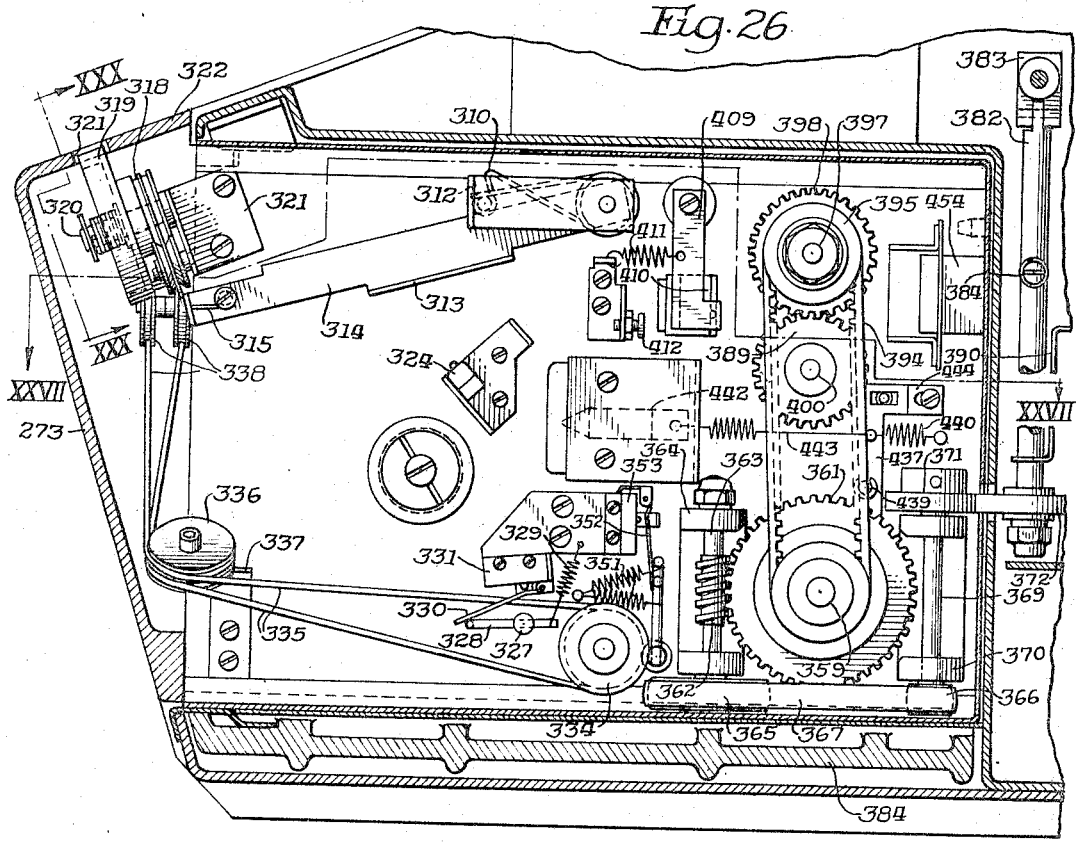
Figure 27:
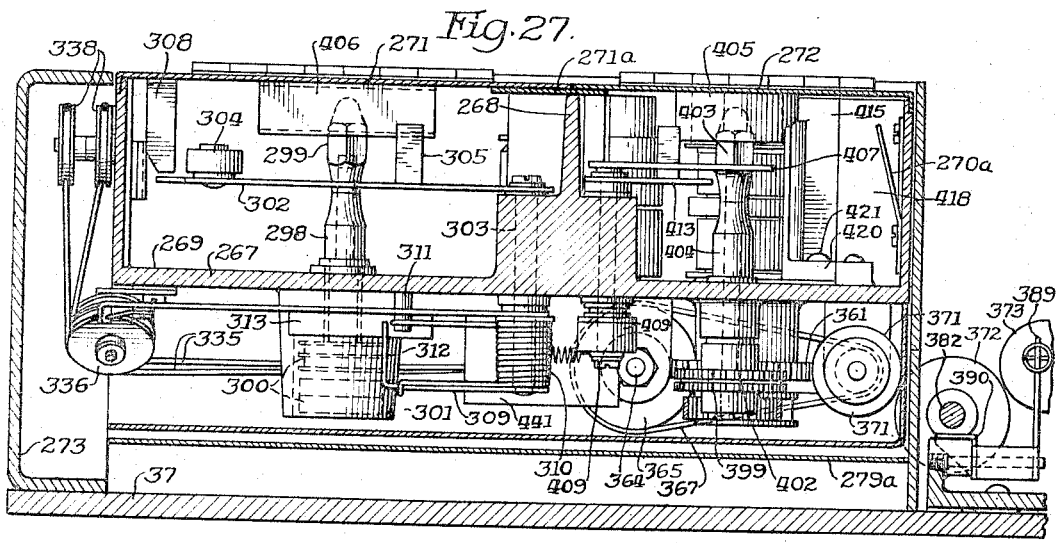

FIGUE 22 is an enlarged fragmentary side elevational view of the front portion of the left side of the machine showing the camera in place and with the access doors thereof removed;

FIGURE 23 is a fragmentary elevational sectional view taken substantially on the line XXIII—XXIII of FIGURE 22;

FIGURE 24 is a fragmentary sectional plan view taken substantially on the line XXIV—XXIV of FIGURE 22;

FIGURE 25 is a fragmentary sectional elevational detail view taken substantially on the line XXV—XXV of FIGURE 22;

FIGURE 26 is a sectional elevational detail view taken substantially on the line XXVI—XXVI of FIGURE 23;

FIGURE 27 is a sectional plan view taken substantially on the line XXVII—XXVII of FIGURE 26;

FIGURE 28 is a fragmentary sectional elevational view taken substantially on the line XXVIII—XXVIII of FIGURE 22;

FIGURE 29 is a fragmentary sectional elevational detail view taken substantially on the line XXIX—XXIX of FIGURE 22;

FIGURE 30 is a fragmentary sectional elevational detail view taken substantially on the line XXX—XXX of FIGURE 26;

FIGURE 31 is a fragmentary isometric detail view of the camera shutter mechanism and operating mechanism;

FIGURE 32 is an enlarged fragmentary sectional elevational view of the shutter mechanism taken in the same plane as in FIGURE 29; and FIGURE 33 is an electrical control circuit diagram for the machine.

In the typical embodiment of the invention illustrated, a neat, compact cabinet 35 (FIG. 1) comprises a housing and mechanism supporting framework including a pair of coextensive spaced parallel left and right side plates 37 and 38, respectively. While a major portion of the housing of the cabinet 35 affords an enclosure for the mechanism chamber area between the frame plates 37 and 38 there are also portions of the housing which afford protective enclosure for those parts of the mechanism which are located on or at the outer sides of the respective frame plates 37 and 38, with suitable removable panels at the sides of the machine for access to such mechanism.

In front the machine is constructed and arranged to receive documents such as checks and the like to be photographed and which are successively automatically fed into photographing position within the main chamber in the housing and then restacked in the same order in which they were fed for ready removal access at the front of the machine. For this purpose, a magazine area 39 is provided in the lower front portion of the cabinet and has associated therewith document feed mechanism. In generally stepped relationship thereabove, is a receiving hopper area 40 to which the documents are delivered after having been photographed.

DOCUMENT MAGAZINE AND FEED MECHANISM

Details of the document magazine and the improved feed mechanism in the area 39 are illustrated in FIGURES 10 and 15–20.

Support for the documents to be photographed is provided by a magazine platform 41 which, desirably, slopes downwardly rearwardly for gravity assist. To maintain the documents in sideward alignment in the stack a spaced opposed pair of adjustable alignment bars 42 is provided. Adjacent to the lower end of the magazine platform 41 are mounted a feed roller 43 to engage the upper faces of the documents to be fed and an opposing reversing roller 44 to engage the lower faces of the documents and prevent all but one document at a time from passing through the feed roller assembly. Both of the rollers 43 and 44 are formed from a peripherally high friction material, but the feed roller 43 is desirably of a higher coefficient of friction than the roller 44 so that a single document engaged therebetween will be positively advanced.

Mounting of the feed roller 43 is on a rotary driven shaft 45 carried by a generally U-shaped bracket 47 (FIGS. 15 and 16) mounted on a cross the frame bar 48 secured horizontally to and between the vertical frame plates 37 and 38.

For drawing the uppermost documents from a stack into the feed rollers, a frictional pull-in assembly comprising a belt 49 is provided. This belt is trained over and runs with an intermediate hub portion of the feed roller 43 and is trained over an idler pulley 50 carried rotatably by a stub shaft 51 on a rocker arm 52 freely relatively pivotally mounted on the shaft 45. Documents are thus drawn into the feed rollers by a combination of the weight of the pull-in assembly, the friction of the belt 49, and by the planetary torque of the assembly as it tries to rotate about its center 45 (FIG. 16). It has been found that this resultant feed pressure permits optimum feeding of a narrow range of document thicknesses, for example from .003" to .006" in thickness. To avoid friction on the plate 41 after the last document in a stack has been fed, an anti-friction roller 53 is mounted to project upwardly through the platform 41 opposite the nip of the pull-in belt. Partial enclosure of the pull-in belt 49 and associated mechanism is effected by means of a front housing panel 54 mounted on a frame tie cross bar 55.

Control of the feed pressure of the pull-in belt for feeding a wider range of document thicknesses is effected by means including a manual actuating lever 57 (FIGS. 10 and 13) projecting generally upwardly along the inner side of the left-hand frame plate 37 and having a manipulating handle 59. At its lower end portion, the lever arm 57 is fixedly secured to a horizontal shaft 60 rotatably mounted in a bracket 61 secured to the top of the frame bar 48. Secured fixedly on an inwardly extending end portion of the shaft 60 are means comprising a cantilever leaf spring arm 62 which projects forwardly and overlies an actuating pin 63 projecting from the free end portion of the rocker arm 52 in the opposite direction from the pulley shaft 51 and preferably coaxially therewith. Normally upward spring bias is exerted on the actuating pin 63, as by means of a cantilever spring arm 64 projecting forwardly into underlying relation to the pin from a rigid mount on the frame bar 48. By having the spring arm 62 slightly stiffer than the lifter spring arm 64 depressing action of the swingable spring arm 62 forces the actuating pin 63 against the tension of the lifter spring arm 64 to press the pull-in belt 49 against the stack of documents to be fed. For retaining the depressed, document-engaging position of the pull-in belt against the bias of the lifter spring 64, the operating lever 57 is provided with detent means comprising a stud 65 engageable in detent socket recess 67. By having a series of the detent sockets 67 selective pressure of the pull-in belt 49 can be effected by tensioned thrust of the depresser spring arm 62. Resilient flexing of the operating arm 57 readily enables springing release and snap-in engagement of the detent stud 65 with respect to the detent sockets. 67. The combination of depresser arm 62 and lifter arm 64 thus increases the range of document thickness which can be fed. When the operating arm 57 is in the dash outline in FIGURE 13, for example, the depresser arm 62 is completely disengaged and the lifter arm 64 just balances the weight and torque of the pull-in belt assembly permitting the feeding of very thin paper, for example onionskin of .002" thickness, which requires an extremely light feed pressure. When the operating arm 57 is in the position shown in FIGURE 13, the depresser arm increases the weight and torque of the pull-in belt assembly, increasing the feed pressure, and permits the feeding of very thick paper for example .010" card stock.

In order to attain as nearly as practicable square feed-in of the successive documents, the pull-in belt 49 is mounted to engage the documents substantially centrally between equal document-gripping portions of the feed roller 43 (FIG. 15). Also, the reversing roller 44 has two equal document gripping portions (FIG. 18) oppositely aligned with the two portions of the feed roller.

In addition, means are provided for adjusting the reversing roller 44 not only for initial document squaring but also for any wear compensation and for establishing proper document batch thickness clearance. For this purpose, the roller 44 is mounted on a shaft 68 the opposite end portions of which are journalled in relatively and jointly vertically adjustable respective bearing flanges 69 of like complementary adjustment lever arms 70. These arms are independently rockably mounted on a horizontal shaft 71 adjacent to the roller 44 and parallel to its axis. Journal means for the shaft 71 are provided by a mounting bracket plate 72 secured on a supporting frame tie bar 73 (FIG. 16) of the cabinet frame structure.

Figure 18:
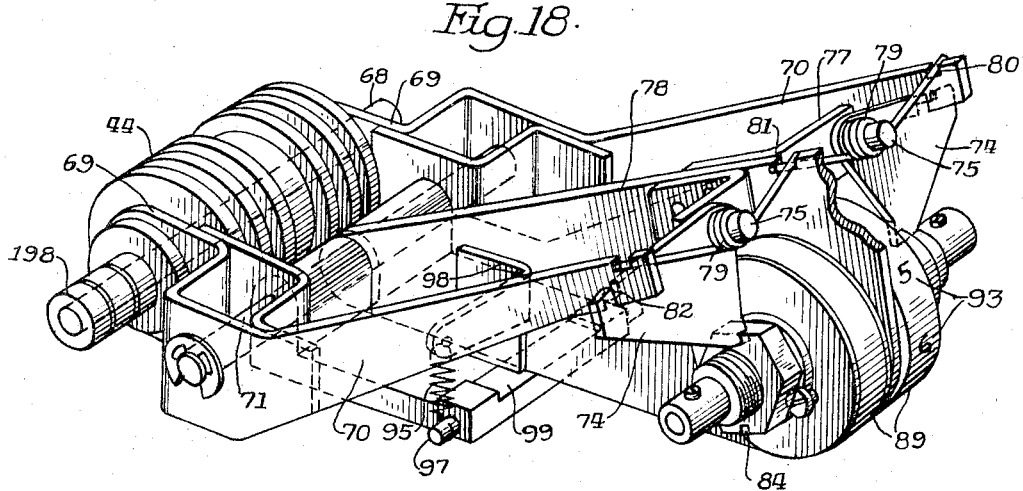
FIGURE 18 is an isometric view of the lower reversely running roller of the document feed assembly and the adjustment means therefor.
Figure 19:
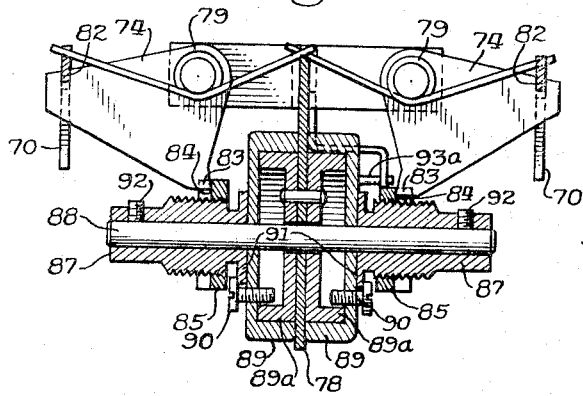
FIGURE 19 is a fragmentary sectional elevational view taken substantially on the line XIX—XIX of FIGURE 16.
Figure 21:
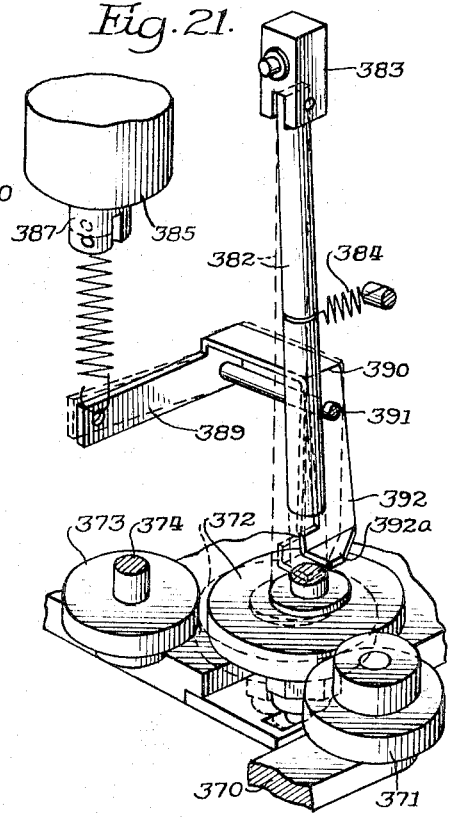
FIGURE 21 is a fragmentary isometric schematic view of the releasable transmission means for powering the film drive for the camera.
Figure 20:
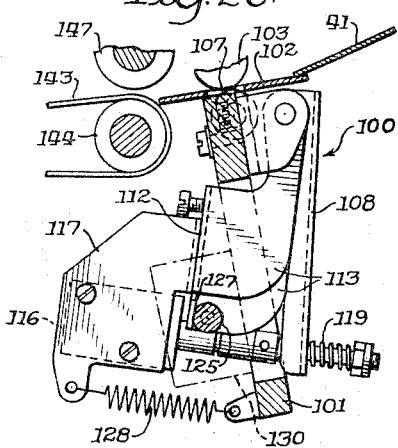
FIGURE 20 is a fragmentary sectional elevational detail view taken substantially on the line XX—XX of FIGURE 17.

Means are provided for individually or jointly adjusting the lever arms 70. For this purpose, the arms project upwardly and forwardly from adjacent to the journalled portions thereof and have their front end portions engaged upon respective transverse bell crank plates 74 which are journalled on respective pintles 75 projecting forwardly from respective flange brackets 77 mounted on a median front-to-rear vertical plane supporting plate 78 having its rear end portion rockably journalled on the shaft 71. Biasing means in the form of respective coiled torsion springs 79 are mounted on the pintles 75 and have respective diverging arms engaging in upwardly opening locating notches 80 in the adjacent end portions of the lever arms 70 and in a locating notch 81 opening upwardly in the adjacent portion of the median supporting plate 78 whereby to maintain downwardly thrusting resilient pressure on the lever arms to maintain them yieldably engaged in respective notches 82 in the bell crank plates 74. This also imposes biasing thrust on the outer end portions of the bell crank plates 74 to thrust lower shouldering terminals 83 thereof into respective interlock notches 84 provided in adjustment nuts 85 (FIGS. 18 and 19). These nuts are threaded onto respective externally threaded sleeves 87 mounted relatively rotatably on a shaft 88 which extends freely through the plate 78.

Independent adjustment rotation of each of the sleeves 87 is facilitated by means of respective manipulating wheels 89 freely rotatably mounted on centrally apertured bearing cups 89a which are concentrically riveted to the plate 78. The shaft 88 is journalled concentrically through the wheels 89. For ready assembly and relative rotary adjustment of the sleeves 87 where required, connecting means are provided comprising in each instance at least one fastening screw 90 threaded into the outer face of the associated adjustment wheel 89 and clampingly corotationally engaging a hub flange 91 of the associated adjustment sleeve. Through this arrangement, turning of the adjustment wheel 89 and the associated sleeve 87 causes the engaged nut 85 to be adjusted axially. Outward running of the respective nut causes upward swinging of the engaged adjustment bell crank 74 and thereby corresponding upward pivoting of the associated lever arms 70 for depressing the bearing flange 69 thereof and thus lowering of that end portion of the reversal roller 44. Inward running adjustment of the nut 85 has the opposite effect, namely of raising the associated end portion of the roller 44.

Although, if preferred, individual adjustment of the rock levers 70 may be permitted to the operator of the machine, such adjustment is highly critical for accurate, so to speak, zeroing-in of the roller 44 to attain square feeding of the documents. Therefore, means are preferably provided to restrict such adjustment to experienced service personnel. For this purpose, locking of the adjustment sleeves 87 to the common shaft 88 is effected by respective set screws 92 threaded through outward elongations or hub portions of the respective sleeves. Thereby, after accurate squaring adjustment or wear compensation adjustment has been effected, the individual adjustment capability of the adjustment sleeves 87 is disabled by locking the sleeves to the shaft 88 by means of the set screws 92.

Even though the adjustment sleeves 87 are locked against individual adjustment turning, they are capable of joint adjustment rotation by turning of the shaft 88 to which they are locked. This is a useful relationship in effecting adjustments as required in the spacing between the reversal roller 44 and the feed roller 45 to accommodate different thicknesses of documents. For instance, such adjustment is desirable to accommodate such diversely different thickness of document as tissue or onion skin paper, ordinary letterhead and legal document or brief stock, bank check paper stock, business machine card stock, etc. To effect such paper thickness adjustment, rotary movement of either of the adjustment wheels 89 will turn the assembly locked to the shaft 88. For guidance in effecting such adjustment, at least one of the adjustment wheels 89 may be provided with suitable gauge marks such as circumferentially spaced guide numbers 93 (FIG. 18), and overrunning is avoided by a one-revolution-stop pin 93a (FIGS. 16 and 19) on the numbered wheel engageable with a fixed stop bar 93b on the plate 78. It will be understood, of course, that the threads on the adjustment nuts 85 and on the sleeves 87 will be properly chosen to effect identical adjustment actuation of the associated bell crank 74 during the unison adjustment through the common shaft 88. Ready access for such adjustment is afforded to the wheels 89 through a clearance aperture 94 (FIGS. 1 and 16) in the front casing or housing enclosure panel of the cabinet.

By having the supporting plate 78 rockably mounted on the shaft 71, the entire assembly is adapted to be rocked to depress the reversal roller 44 should it be desired at any time to pass an individual thicker document or small group of thicker documents without making adjustment through the adjustment wheels 89. Such rocking of the entire assembly can be effected by pushing up on the exposed end portion of the plate 78 at the access aperture 94. Normally the assembly is held in the predetermined adjusted relationship by yieldable biasing means comprising coiled tension springs 95 anchored at one end to respective studs 97 on the base plate 72 and at their opposite ends to respective bracket arms 98 projecting laterally from the supporting plate 78. In the thus resiliently held position, the lower edge of the plate 78 bottoms against an upwardly facing supporting shoulder 99 on the forward end portion of the base plate 72.

Means are provided for detecting and stopping the feeding of double documents that may escape the reversal roller 44 due to being stuck or stapled together, doubled over in such a manner that the reversal roller will not straighten them out, and the like. Such a detector having convenient means for adjusting it in conformity with adjustment of the reversal roller 44 and also having means for inactivating it when its use is not desired is depicted in some detail in FIGURES 10, 16, 17 and 20, comprising an assembly 100 mounted on a frame tie bar 101 located generally below the frame bar 48 inwardly beyond the feed rollers and supporting a document guide plate 102 serving as an extension of the document guide path from the inner end of the magazine platform plate 41. A guide roller 103 serves as an anti-friction holddown above an opening 104 in the plate 102 and is fixedly adjustably mounted on a bracket 105 attached to the frame bar 48.

Opposing the holddown roller 103 is a thickness detector roller 107 which is desirably carried freely rotatably, and in a manner to be selectively operable and to be adjusted for document thickness by a short leg of a bell crank member 108 which is pivotally mounted on a shaft 109 supported by a bracket 110 attached to the frame bar 101. Conveniently, the bell crank 108 is formed of light gauge sheet metal and of generally U-shaped cross-section, with a long leg projecting downwardly.

Cooperating with the bell crank 108 are adjustment and control means including a mounting plate 112 of substantially greater width than the bell crank and having spaced parallel coextensive side flanges 113 by which the plate is pivotally suspended on the shaft 109 for swinging clearance through a suitable aperture 114 in the frame bar 101. By virtue of its pivotal mounting, the bell crank 108 normally tends to swing gravitationally for moving the detector roller 107 into inactive non-detecting position below the path of movement of documents over the guide plate 102.

For actuating the double document detector, a solenoid 116, mounted on a bracket plate 117 carried by the swing plate 112, is adapted to be energized. This retracts an armature 118 which is normally gravitationally biased into protracted position and has an end portion extending through the lower end portion of the bell crank and provided with a yieldable cushioning coupling as by means of a compression spring 119. This draws the bell crank toward a micro or snap switch 120 having an actuating plunger 121 positioned to be engaged by a pressure pad or boss 122 on the bell crank. A stop abutment 123 simultaneously engages an adjustable stop screw 124, limiting the stroke of the armature 118.

For adjusting the double document detector with reasonable accuracy as to document thickness, an adjustable conical cam 125 (FIGS. 17 and 20) is engageable with an abutment or follower surface 127 on the plate 112 which thrusts against the cam under bias as imposed by means of a tension spring 128 (FIGS. 10 and 20) anchored at one end to the frame bar 101 and at its opposite end to the bracket 117. By axially moving the conical cam 125, fine incremental swinging adjustments of the plate 112 are enabled and thus operator adjustments of the detector roller 107.

Figure 1:
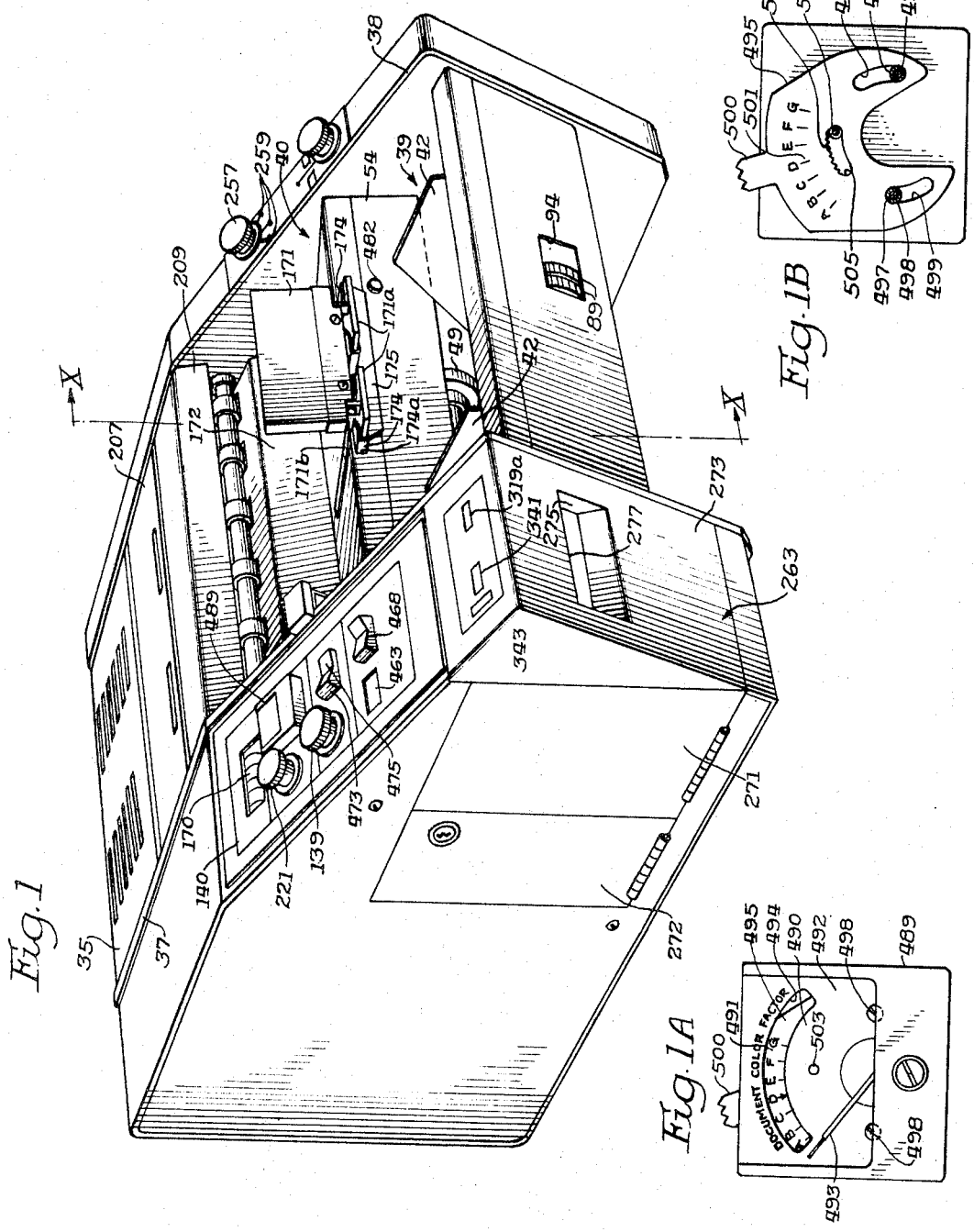
FIGURE 1 is a perspective view of a microfilm recorder machine embodying features of the invention.
Figure 2:
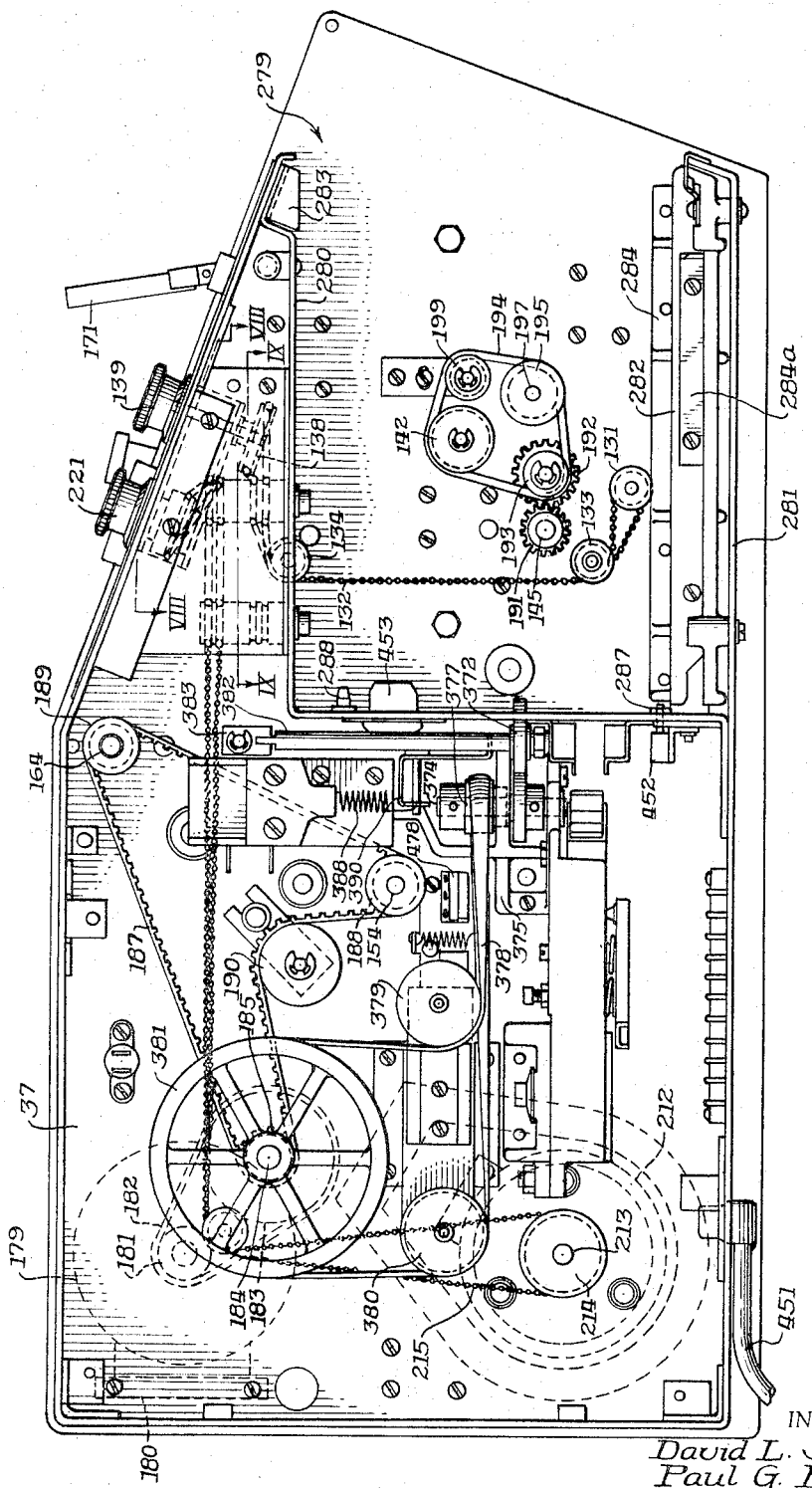
FIGURE 2 is a left side elevational view of the machine with the side housing plate, camera housing chamber plate and the camera removed.

Manual adjustments of the conical cam 125 are adapted to be effected manually by turning a cam rod 129 of which the cam is a tip end portion and which is threaded through a mounting block 130 (FIGS. 10 and 17) carried by the frame bar 101. For convenience in manipulation, the cam rod 129 is coupled by means comprising a slip connection 130a with a shaft structure 130b journalled through the frame plate 37 and carrying a pulley 131 (FIGS. 2 and 17). Trained over this pulley is an endless flexible actuating transmission member comprising a bead chain 132 running over guide pulleys 133 and 134 toward the top of the cabinet along the outer side of the frame plate 37 then over an idler pulley 135 (FIGS. 2 and 9) carried by a bracket plate 137. Finally the adjustment drive chain 132 is trained over a drive pulley 138 attached to the lower end of a manual actuating knob 139 (FIGS. 1 and 2) conveniently mounted on an instrument panel 140 on the upper front left-hand portion of the machine cabinet. Through this arrangement, by suitably turning the knob 139 accurate adjustment of the double document detector 100 is accomplished. In operation, the knob 139 is turned until the space between the rollers 103 and 107 is slightly more than the thickness of the documents being fed.

When the double document detector 100 is activated by energizing of the solenoid 116 and thus closing of the normally open switch 120, any substantial increase in the thickness of document material entering (such as a double document or a single document of greater thickness than the adjustment) between the holddown roller 103 and the detector roller 107 causes the detector roller to be depressed and swing the bell crank 108 away from the switch 120 as permitted by the yieldable coupling spring 119, whereby the switch 120 is opened. This has the effect of deenergizing a magnetic feed roll clutch 141 (FIG. 15) by which the feed roller shaft 45 is coupled in operation with a drive pulley 142. Since the reversing roller 44 continues to operate, the lower sheet of the double document is reversed and withdrawn from the detector in oscillating fashion until the upper sheet has passed through. The oscillation is caused by the switch 120 opening and closing as the lower sheet alternately advances and is retracted. Electrical circuitry and related electrical control components will be presently described.

DOCUMENT TRANSPORT MEANS

Normally, documents are fed from the magazine 39 at high speed and past the double document detector 100 and delivered from the guide plate 102 to a transport conveyor system (FIGS. 10, 14 and 15) including a transversely spaced set of endless conveyor belts 143 trained over rollers 144 adjacent to the guide plate 102 and carried by a shaft 145. Tensionably biased idler rollers 147 oppose the belts as they run over the rollers 144 and provide a lead-in for the advancing documents gripping the documents and thereby advancing the documents with the conveyor belts under holddown fingers 148 whence the documents engage under idler rollers 149 and continue onward with the conveyor belts. Beyond the idler rollers 149, the documents pass under a guide plate 150 in a curving path upwardly, with idler rollers 151 and 152 successively coacting with the belts to assure onward uninterrupted movement of the transported documents. Opposite the tensioned idler rollers 152, the conveyor belts 143 are trained over drive rollers 153 on a shaft 154 in a return run around tensioned take-up rollers 155 to the starting point over the rollers 144.

As the transported documents leave the conveyor belts 143 and the guide plate 150, they pass through a space comprising a scanning zone gap 157 wherein both the front and back faces of the document are exposed for photographic scanning. Beyond this gap, the documents are engaged in a second section of the transport conveyor system comprising a set of endless conveyor belts 158 similar to and similarly spaced as the belts 143 trained over lead-in rollers 159 opposing which are idler rollers 160. The belts 158 then travel along a curved take-out guide plate 161 over a set of intermediate idler rollers 162 and then over driving rollers 163 on a shaft 164 with which biased pressure rollers 165 cooperate to propel the documents from the conveyor exit into the receiving hopper 40. In their return runs, the conveyor belts 158 travel over tensioning rollers 167.

At a suitable point in the movement along the transport conveyor sections, and, as shown in association with the upper conveyor section, sensing means are provided for recording the number of documents processed. In this instance, this comprises a sensing switch 168 mounted on the guide plate 161 and having a set of paddle wheel sensing arms 169 successively movable into the path of movement of the documents to be actuated thereby in a rotary path and thus pulse the switch for controlling a suitable electrical circuit for operating a counter 170 suitably disposed in a convenient position on the instrument panel 140 (FIG. 1). Guide fingers 169a hold the document in place on either side of the paddle wheel arms 169.

In the receiving hopper 40, documents are restrained by a front stop 171 and a rear or back stop 172 which is part of a platform 173, to drop down between the upper portions of the side frame plates 37 and 38 onto the receiving platform 173. For compound extension adjustment to accommodate different size documents, the front stop 171 is pivotally mounted on bars 171a slidably mounted in trackways 174 which in turn are longitudinally slidably engaged in complementary trackways 174a in the platform 173 and provided with a front handle flange 175 by which they are connected and can be readily shifted forwardly or rearwardly. The telescoping action thus provided permits documents up to 14" in length to be accommodated. Forward tilting of the front stop 171 raise rearwardly extending lifter fingers 171b thereon to facilitate removing a stack of documents.

Mounting of the platform 173 on the frame tie bar 55 is through releasable means 177 enabling removal of the platform for access to the interior of that portion of the cabinet closed thereby, and more particularly the feeding and document transport structures. The platform rotates around a separable pivotal pin and clip mount 178 when being removed.

Driving of the document transport conveyor system as well as the document feed roller assembly is accomplished by means of an electrical motor 179 conveniently mounted in the upper rear portion of the chamber within the cabinet on a frame tie bar 180 (FIGS. 2 and 10). On the motor drive shaft is a driving pulley 181 located adjacent to the inner side of the left side frame plate 37 and having trained thereover endless flexible driving belt means 182 running over a transmission pulley 183 on a shaft 184 journalled through the side plate and carrying a compound pulley on its outer end portion including a small diameter portion 185. Over the pulley portion 185 is trained a flexible endless driving belt member 187 which runs drivingly over a pulley 188 on the outer end portion of the conveyor belt shaft 154 and a pulley 189 on the outer end portion of the conveyor belt shaft 164. An adjustable belt tensioning idler roller 190 takes up slack in the driving belt 187. Driving of the shaft 145 by means of the driven conveyor belts 143 functions to drive a gear 191 on its outer end portion which meshes with a spur gear 192 joined to a pulley 193 over which is trained a driving belt 194 running over the feed roller driving pulley 142 and a driving pulley 195 on a shaft 197 journalled through the frame plate 37. This shaft 197 is coupled to the reversing roller shaft 68 as by means of a suitable flexible thimble coupling 198 (FIG. 18). An adjustable slack take-up and tensioning pulley 199 is engaged within the drive belt 194. Through this arrangement, the feed roller assembly and the document transport conveyor assembly are driven synchronously.

DOCUMENT SCANNING

As the documents pass upwardly through the scanning zone gap 157, they are brightly illuminated on both front and back faces by respective banks of lamps mounted in housings 201 (FIGS. 10 and 14). Each of these lamp housings 201 is mounted for ready servicing accessibility for lamp replacement and includes means for retaining it in the operating position and in a position to be serviced. To this end, each of the lamp housings 201 is suitably pivotally mounted as by pivot stud means 202 at its opposite ends on the respective side frame plates 37 and 38 whereby the housing will extend in a generally downwardly pendant position for document illumination as shown in full outline in FIGURE 10 and can be swung up into a servicing position as indicated in dot-dash outline. Means for maintaining the lamp housing in either of the positions comprises a double acting overcenter coiled snap spring 203 having one end anchored to a stud 204 on the adjacent side frame plate and the opposite end anchored to a stud 205 on the end of the housing.

Access to the front lamp housing 201 is readily attainable by removal of the receiving hopper platform 173. Access to the rear lamp housing 201 is readily attainable by swinging upwardly an access door 207 in the roof paneling of the cabinet 35 and attached to the cabinet on a hinge structure 208. Further access into the top of the cabinet can be had by snap-out removal of a front panel and guard plate 209 forwardly of the door 207 and overlying the upper portion of the transport conveyor system.

Since the lamps generate substantial heat, cooling ventilating means are provided comprising a fan 210 mounted in the lower rear portion of the cabinet chamber and effective to draw air through the chamber and expel it rearwardly from the cabinet. Over the motor 179 the cabinet housing is provided with suitable air inlet louvers 211 for entry of cooling air to sweep heat from the motor 179 under the suction induced by the fan.

Means are provided for adjusting intensity of illumination from the banks of lamps 200 to attain substantially uniform photographic image reproductions with documents of different light absorption values, generally predeterminable from the color of the paper of the documents. Conveniently, such means comprise an autotransformer 212 (FIG. 2) mounted on the inner side of the frame plate 37 and having a shaft 213 projecting outwardly therethrough for effecting rotary adjustments. For such rotary adjustments a pulley 214 attached to the shaft has trained thereover a flexible transmission member in the form of a bead chain 215. This chain runs over a series of suitably placed guide pulleys, including on the base plate 137 a pulley 217 (FIG. 8) and the pulley 135. Additionally, a guide pulley 218 carried by a bearing bracket structure 219 guides the chain 215 for drivingly running over a drive pulley 220 having a manually engageable adjustment knob 221 (FIGS. 1 and 2) readily accessible on the instrument panel 140. Through this arrangement, by manipulating the knob 221 adjustments of the auto-transformer 212 are easily and quickly effected for proper illumination of batches of documents to be photographed.

As each illuminated document passes through the scanning aperture or slit zone 57, and assuming it is illuminated, respective front and back elongated narrow divergently related scanning mirrors 222 carried in suitable mounts 223 (FIGS. 10 and 12) reflect images of the document faces into an optical path in a wrap-around light tunnel provided by the right side and bottom of the cabinet 35. For this purpose, the front face image is directed through a slot 224 in the right side wall frame panel 38 and the rear face image is reflected through a similar aligned slot 225 in such frame panel. Thence the images are reflected downwardly by a mirror 227 (FIGS. 3, 12 and 14) onto a mirror 228 which reflects the images through a lower tunnel slot 229 in the panel 38 whereby the image beam passes through the bottom portion of the cabinet chamber and through a slot 230 in the left side frame plate 37 onto a diagonal mirror 231 carried by a mounting 232 and directing the images forwardly.

To enable selective photographing of both front and rear faces of documents or either the front or the back faces, means are provided comprising an elongated shutter flap 233 mounted longitudinally between the upper mirror 227 and the lower mirror 228 (FIGS. 3 and 14) and carried by respective front and rear supporting brackets 234 common to these mirrors. In a desirable form, the shutter member 233 comprises a sheet metal body of generally V-shaped cross-section having on its front half portion an intercepting flange 235 corresponding in length generally to the upper front image beam slot 224 and on its rear half an intercepting flange 237 corresponding in length generally to the rear image beam slot 225. These flanges 235 and 237 project from opposite edges of the body 233 and in relatively divergent relation to one another affording, when viewed from one end of the shutter member, a generally W-shaped cross-sectional configuration. Through this arrangement, the shutter flap member is adapted to be disposed in a neutral position wherein both of the shutter flanges 235 and 237 are clear of the optical path, as shown in full line in FIGURE 14. By turning the shutter member counterclockwise as viewed in dash outline in FIGURE 14, the rear flange 237 is moved into image-blocking position, while turning of the shutter member clockwise will bring the intercepting flange 235 into image-blocking position. For this purpose, the shutter member is mounted on an offset rotary axis through respective transverse mounting flanges 238 on its opposite ends. The rear flange 238 has a bearing aperture 239 through which is received a pintle 240 carried by the rear bracket 234, with a take-up and frictional drag compression spring 241 about the pintle thrusting between the bracket and the adjacent bearing flange.

Mounting of the front end portion of the shutter flap 233 is effected in a manner enabling adjustment manipulation of the shutter. For this purpose, as best seen in FIGURES 3 and 6, the front end mounting flange 238 of the shutter has suitably secured thereto as by means of riveting a forwardly projecting stub shaft 242 coaxially aligned with the bearing aperture 239 of the rear mounting flange. This stub shaft extends through a bearing 243 mounted in the front bracket 234. Proper axial adjustment of the shutter is maintained by a collar 244 interposed between the flange 238 and the bearing 243 and fixed on the shaft 242 as by means of a set screw 245.

Each of the three desired settings of the flap shutter 233 is releasably maintained by strain separable detent means herein comprising a detent plate 247 secured on the shaft 242 forwardly from the bracket 234 and having a series of three circumferentially spaced detent socket apertures 248 (FIG. 4) selectively receptive of a spring biasing ball detent 249 mounted behind the detent plate on the associated bracket 234. Thus, the central socket 248 defines the neutral position of the flap shutter, the upper of the sockets defines the downturned position of the shutter with the intercepting flange 235 in its operative position, and the lower of the sockets 248 defines the upturned position of the shutter wherein the intercepting flange 237 is in its operative position.

Rotary adjustment of the flap shutter 233 is effected manually by means comprising a pulley 250 mounted on the forwardly projecting portion of the shaft 242 contiguous the detent plate 247 and over which is trained an endless flexible transmission element comprising a bead chain 251. As best seen in FIGURES 3 and 4, this chain extends up over a guide bracket 252 mounted on the outer face of the cabinet frame plate 38 above the front supporting bracket 234 and guides the chain for running engagement about a pulley 253 on a shaft 254 journalled on a bracket 255 and extending up through the overlying portion of the cabinet housing. On its upper end portion, the shaft 254 has attached thereto a manipulating knob 257 under which is a panel 258 carrying indicia 259 (FIG. 1) for guidance in turning the knob 257 for attaining the three selective settings of the associated shutter.

Means are provided whereby operation of the shutter 233 for front only photographing will actuate switch means desirable in the operating circuit for the machine, to be more particularly described hereinafter. To this end, a generally L-shaped switch actuator 260 (FIGS. 3, 5 and 6) is mounted fixedly on the shutter shaft 242 and has an arm 261 which is neutrally positioned in the neutral position of the shutter. Upon turning of the shutter 233 into front image photographing position only, as in a 24/1 reduction sequence, the arm 261 actuates and closes a normally open switch 262 which is connected in and thereby completes an energizing circuit through the feed roller clutch 141.

CAMERA

As the document images travel through the optical path tunnel and are reflected forwardly from the final and shortest reflecting mirror 231, progressive reduction is effected and the images are received in a camera 263 in which simultaneous photographing of the entire image pattern, in duplicate, is effected in parallel, side-by-side focal planes 264 and 265 (FIG. 12). Any preferred microfilm reduction ratio may be provided for of which 44 tool, 32 to 1 and 24 to 1 suit various purposes. In microfilming checks, for example, a 44 to 1 ratio enables placing the images of both the front and back faces of each check side-by-side on a 16 mm. film strip.

According to the present invention, the camera 263 is constructed and arranged as a substantially self-contained unit to be mounted removably in the front left side portion of the cabinet 35 along the outer side of the frame plate 37 and when thus mounted appearing substantially as a part of the cabinet (FIG. 1). To this end, the camera comprises a housing and frame structure 267 (FIG. 22) of generally box-like construction adapted to be made as a molding or casting and having an intermediate substantially vertical partition 268 dividing it into an unexposed or film supply chamber 269 and a photographing and exposed film or take-up chamber 270. Both of these chambers open toward one side, in this instance the left side of the camera box, and are respectively closed when in service by closingly interlocked hinged doors 271 and 272. Where the doors come together over the partition 268, an inset interlock flange extension 271a (FIG. 27) on the margin of the door 271 is interlockingly overlapped by the contiguous margin of the door 272. A lock 272a (FIG. 1) on the door 272 prevents unauthorized opening of the camera.

For ready manipulation of the camera box 267, it is provided on its front end with an attached combination handle and casing shell frame member 273, conforming generally to the associated front portion of the machine cabinet and adapted to be attached removably as by means of screws 274 to the camera box. In the front of the shell 273 is provided a hand hole 275 defined on its upper margin by a hand grip flange 277. A closure and guard plate 278 is secured inwardly from the hand hole and the hand grip flange 277.

For receiving the camera 263 in a front-to-rear sliding assembly relation, the machine cabinet is provided with a front and left side opening camera-receiving recess 279 (FIGS. 2 and 22) defined at its inner or right side by the outer side of the left frame plate, at its top and rear by a camera housing structure 280, and at its bottom by a bottom member 281 of the cabinet housing.

Accurate guiding of the camera into position in the camera recess 279 is accomplished by a longitudinal upwardly facing rail 282 near the bottom of the recess and a downwardly projecting guide lug flange 283 in the top of the recess. In a practical arrangement, the rail 282 is mounted on a supporting bracket 284 secured to the frame plate 37 and spacing the rail therefrom. Mounting of the guide lug flange 283 is in the front roof portion of the recess 279 to project a limited distance below the roof provided by the housing member 280. Through this arrangement, when mounting the camera a longitudinal track groove 285 (FIGS. 23 and 28) in the lower inner corner portion of the camera box 267 is aligned with the rail 282, and a corresponding track groove 286 in the upper inner corner of the camera box is aligned with the guide lug 283. The camera is then readily inserted by sliding it rearwardly into the recess until the rear portion of the camera box meets a stop 287 (FIG. 2), and engages a stabilizing pin 288, both mounted on the rear forwardly facing wall portion of the casing member 280. A latch shoulder 267a (FIG. 22) mounted on the bottom of the camera box 267, engages a catch or keeper flange 284a (FIG. 2) fastened to the bracket 284, thus holding the camera firmly but releasably (by slight upward tilting of the camera) between the stop 287 and the keeper.

In the arrangement shown, the inner face of the camera box is spaced substantially from the frame plate 37 to provide a mechanism clearance space and in which is accommodated a mechanism housing 289 secured to the camera box and cooperating therewith to complete the guide grooves 285 and 287. Between the camera housing 289 and the mechanism on the outer side of the cabinet frame plate 37 is a camera chamber plate 279a (FIGS. 27 and 29) mounted on the bracket 284. In the bottom of the chamber 279, a floor plate 279b is mounted on the bracket 284.

Loading of film into and unloading of film from the camera 263 can be effected before it is mounted in place in the cabinet or while it is thus mounted, the latter situation being fully accommodated through opening of the exposed doors 271 and/or 272.

Within the camera box unexposed film 290 is fed from reels mounted within the front film supply chamber 269 and threaded through an opening in the lower portion of the partition 268, first over downwardly facing idler rollers 292, and then up and over upwardly facing idler rollers 293. Thence the film travels onto and over focal plane rollers or drums 294 (FIGS. 22 and 24) aligned with respective lenses in objective barrels 295 which receive the document images reflected thereto from the mirror 231 and focus the same onto the film in the focal planes 264 and 265 provided by the drums 294. After exposure, the film is wound on take-up reels 297 in the compartment 270 above the film drums 294. To facilitate removal of less than the full supply of film, a film cutter 270a is conveniently mounted in the compartment 270.

Mounting of two of the film supply reels 291 on a common axis in the supply chamber 269 of the camera box is provided for by means of a dual spindle structure comprising an inner sleeve section 298 (FIG. 27) journalled in and extending through the inner wall of the camera box and in turn having jourrnalled therein and therethrough an outer reel spindle section 299. Through this arrangement, each of the spindle sections 298 and 299 is independently rotatable on the same axis. Further, each of the spindle sections is provided with a readily adjustable friction drag brake assembly 300 within a hollow inwardly projecting boss 301 on the camera box wall.

Means are provided for indicating the amount of film on the supply reels 291 at any given time and for indicating when approximately the end of the film supply is reached. To this end, a lever arm 302 (FIGS. 22 and 27) is mounted rockably on a shaft 303 journalled through the inside wall of the camera box 267. This arm 302 is located to overlie the outermost of the reels 291 and carries on its free end portion a follower roller 304 adapted to ride on the roll of film in the reel. To facilitate manipulation of the lever arm 302, it has a handle flange 305 projecting outwardly. During loading and unloading of supply reels, the lever arm 302 is swung upwardly by manipulation of the handle flange 305 to engage the free terminal of the arm on an upwardly projecting leaf spring detent 307 which holds the arm inactive. Automatic release of the arm into film engaging position is effected by a detent releasing finger 308 carried by and operative when the door 271 is closed.

For visual signalling of the condition of the supply film on the supply reels, an actuating arm 309 is rigidly affixed to the end of the follower lever arm 302 (FIGS. 26 and 27) and is normally biased downwardly by means such as a torsion spring 310 which encircles the shaft 303 and has one end anchored to a stud 311 and its opposite end torsionally thrusting downwardly on the arm 309. On its free end portion, the arm 309 is provided with an angular thrust flange 312 directed toward the camera box wall and overlying an abutment flange 313 on a signal actuating lever arm 314 which is freely pivotally mounted on the shaft 303 and projects forwardly therefrom in the front end of the camera box and has secured to its free terminal portion a pull cord 315. This cord is trained over an antifriction guide pulley 317 (FIGS. 26 and 30) and is anchored to a reel 318 integral with a rotary indicator drum 319 having suitable indicia on its perimeter. This drum is mounted on a shaft 320 carried by a bracket 321 secured to the camera housing box 267 in suitable position to support the drum for viewing of its perimeter through a window aperture 319a (FIGS. 1, 23, 26 and 30) in a top panel 322 on the combination handle and housing member 273. Normally the drum 319 is biased into a zero position by means such as a coiled torsion spring 323 anchored at one end to the shaft 320 and at its opposite end to the drum. Through this arrangement, after the follower arm 302 is released for engagement of the film roll and the lost motion connection between the flanges 312 and 313 connects the arms 302 and 314, paying out of the film from the supply reel gradually causes the indicator drum 319 to be turned to reveal by its peripheral indicia the film footage which has been stripped from the film roll.

When the film supply has been paid out to within a predetermined short distance from the end of the spool of film, a suitable alarm or signal is adapted to be activated by the film footage indicator arm flange 313 through actuation of a snap switch 324 mounted in its path on the camera box.

If the film has been misthreaded on the supply reel or the supply reel is placed in position backward, a signal is adapted to be given through an arm 325 (FIG. 22) mounted adjacent to and under the pay-off side of the supply reel on a lever 326 carried by a shaft 327 journalled in the vertical side wall of the housing 267. When the arm 325 is engaged by misthreaded or improperly loaded film it rocks the lever 326 and turns the shaft 327 which carries on its outer end portion an actuating arm 328 (FIG. 26) normally biased to inactive position by a light tension spring 329. Film actuated swinging of the arm 328 causes it to actuate an operating lever 330 of a snap switch 331.

As the film 290 travels over the respective idler rollers 292, one such roller, herein the outermost, drives film frame counting or meter means useful in providing a record of location on a roll of film of the images of certain documents or batches of documents. To this end, the outer one of the idler rollers 292 serves as a capstan and is mounted fast on a shaft 332 (FIG. 23) journalled through the companion idler roller 292 and the vertical camera box wall and a boss 333 thereon. On its end portion adjacent the boss 333, the shaft 332 has attached corotatively thereon a pulley 334. Running over the pulley 334 is a flexible endless transmission cord 335 (FIGS. 22, 23 and 26) trained over a guiding idler pulley 336 carried by a bracket 337 mounted on the front marginal portion of the camera box wall. Thence the cord 335 is trained to travel in an upward generally diagonal direction to run over a pair of guide pulleys 338 (FIG. 27) freely rotatably mounted on the front of the camera box adjacent to and in peripheral alignment with an actuating pulley 339 about which the cord runs drivingly. This pulley 339 is mounted on the worm shaft of an index meter in the form of a conventional digital counter 340 (FIGS. 22 and 23), the conventional numbered disks of which are observable through a window aperture 341 in the camera housing panel 322. For selectively resetting the counter, a wheel 342 is accessible through a suitable aperture 343 in the panel 322.

Each of the idler rollers 293 (FIGS. 22 and 25) is adapted to serve as a film tension failure detector. For this purpose, the outer one of the rollers 293 is mounted on a rocker arm 344 corotatively secured to a shaft 345 which is journalled through a sleeve shaft 347 to which is fixedly corotatively secured a rocker arm 348 freely rotatably mounting the inner of the rollers 293. The coaxially aligned shafts 345 and 347 extend relatively rotatably through the vertical camera box wall and have secured to their free end portions respective switch actuating generally radially extending angular arms 349 and 350, respectively to which are secured biasing means in the form of respective tension springs 351 (FIG. 26) normally biasing the arms and thereby the associated shafts and the roller carrying rocker arms toward the right, that is clockwise as viewed in FIGURE 22, and conversely counterclockwise in FIGURE 26, wherein an actuating arm 352 of a normally open snap switch 353 is actuated to close the switch. With the film running properly over the rollers 293, the film tension rocks the detector mounts thereof in opposition to the bias of the springs 351, whereby the switch 353 remains open. Should there be a break in the film, or for some other reason a slackening of either film strip the associated switch actuating arm 349 or 350 will snap the detector switch 353 closed.

Where only one roll of film is to be run through the camera, it is mounted to follow the outer of the film tracks, and means are provided for disabling the detector mechanism associated with the inner of the idler rollers 293. Conveniently, this comprises a disabling cam arm 354 (FIGS. 22 and 23) fast on a shaft 355 journalled in a shroud piece 357 protectively mounted over the rollers 292 and comprising a lower extension of the partition 268. On its exposed outer end, the shaft 355 is provided with suitable means such as a screwdriver or coin edge receiving slot 358 by which the shaft can be turned selectively to shift the disabling or deflecting cam 354 from the neutral retracted position shown into a projected position wherein it deflects and maintains the roller carrying rocker arm 348 into the normal film tension responsive position while its film track remains idle.

Both the film drums 294 and the take-up reels 297 are positively driven in unison. For this purpose, the film drums 294 are mounted on a common driven shaft 359 (FIGS. 26 and 28) with suitable friction clutch connection enabling individual film slippage for take-up purposes. This shaft extends through the vertical wall of the camera housing 267 and a boss 360 projecting therefrom and has mounted corotatively on its end portion adjacent the boss a worm gear 361. This meshes with a driving worm 362 of a power transmission system and carried by a vertical shaft 363 journalled in a bracket 364 located forwardly adjacent the gear 261. On its lower end portion the worm shaft carries a pulley wheel 365 over which is trained an endless drive belt 367 running over a pulley 368 on the lower end of a vertical shaft 369 journalled by a bracket 370 rearwardly adjacent the gear 261 and carrying corotatively on its upper end a transmission friction wheel 371 having its perimeter exposed through the rear wall of the camera box housing 289.

Differences in film speed to accommodate various reduction ratio adjustments can be readily effected by suitably varying the diameter ratios of the drive belt pulleys 365 and 368. Thus, separate cameras for, say, 44/1 ratio, 32/1 ratio and 24/1 ratio will be suitably equipped with proper driving pulley diameter ratio, and that is the only driving adjustment that need be made in the respective cameras to be employed selectively depending on the type of documents to be photographed.

A power driving connection with the camera through the driving friction roller or wheel 371 is provided for in the machine cabinet and to be automatically operative as an incident to full mounting of the camera in the camera-receiving recess or compartment 279. For this purpose, a frictional free-running power transmission or clutch roller wheel 372 (FIGS. 2, 21, 26 and 27) is mounted to project through the rear vertical wall provided by the casing portion 280 for peripherally engaging the driving wheel 371. Power is derived from a driven friction roller wheel 373 with which the transmission wheel 372 is engageable peripherally simultaneously as with the driving wheel 371. This power wheel 373 is mounted on a fixed vertical axis on a rotary shaft 374 journalled on a bracket 375 suitably attached to the outer face of the frame plate 37. Corotative on the shaft 374 is a pulley 377 over which is trained a drive belt 378 suitably running over an idler roller 379 and a slack take-up and tensioning idler roller 380 and over a large diameter driving pulley portion 381 of the compound pulley having a common hub with the pulley 185 on the shaft 184 and by which power from the motor 179 is transmitted to the drive belt 378.

In order to conserve film, it is desirable to advance the film only coincident with passage of a document to be filmed through the exposure and scanning slit aperture zone 157. To this end, the power transmission wheel 372 is mounted to serve in association with the wheels 371 and 373 as a releasable clutch and is freely rotatably mounted on the lower end portion of a pendant shaft 382 freely swingably pivotally attached at its upper end portion to a mounting block 385 fixedly attached to the frame panel 37. Normally the shaft 382 is biased as by means of a tension spring 384 to swing about its pivot and move the transmission wheel 372 out of driving relation to at least the driving wheel 371 as shown in full outline in FIGURE 21. Hence, the driving motor can run continuously and thereby also the power wheel 373 can run continuously at full speed.

Coincident with passage of a document to be photographed through the scanning zone, the transmission wheel 372 is snapped into power transmission engagement with the wheels 371 and 373 by means of herein comprising a solenoid 385 having its armature 387 connected by resiliently yieldable means such as a tension spring 388 to an arm 389 of a rocker bracket 390 mounted on a shaft 391 on the bracket 375. A depending thrust arm 392 on this bracket has a thrust terminal flange 392a which engages the lower portion of the transmission wheel shaft 382 and thus yieldably but firmly pushes the transmission wheel into self-aligning positive driving engagement with the wheels 371 and 373 as shown in dash outline in FIGURE 21. This establishes an instantaneous driving response in the film driving system. By the same token, there is substantially instantaneous stopping of the film transport or driving system when the solenoid 385 deenergizes to release the trasmission or clutching position.

Driving of the take-up reels 297 is effected from the film drum shaft 359 (FIGS. 26 and 28) through a toothed pulley 393 thereon contiguous to the gear 361 and over which is trained a toothed driving belt 394 running over a similar toothed pulley 395 mounted on a shaft 397 carried by the upper portion of the camera housing vertical wall and mounting in friction clutched relation to the pulley 395 a pair of identical driving gears 398. One of these driving gears 398 meshes with a driven gear 399 fixedly attached to a shaft 400 journalled through a tubular shaft 401 on which is fixedly secured a driven gear 402 with which the other of the friction clutched gears 398 meshes. The shafts 400 and 401 extend rotatably through the camera box wall, with an outer take-up reel spindle section 403 fixedly attached to the shaft 400 and an inner take-up reel spindle section 404 fixedly attached to the tubular shaft 401. Through this arrangement the take-up spindle sections are adapted to be driven a slight overspeed differential relative to the film drums 294 for maintaining a positive tension on the film.

As best seen in FIGURE 28, at least the take-up compartment door 272 may carry a take-up reel retaining means comprising an abutment 405 to assure alignment of the take-up reel with the film drum 294. Similar retaining abutment means 406 may be carried by the inside of the door 271 for the supply film reels.

Means are provided for detecting the maximum film loading desired for at least the outer of the take-up reels 297. For this purpose, a detector arm 407 (FIGS. 22 and 27) is mounted on a shaft 408 journalled through the camera box wall and carrying on its opposite end portion a depending arm 409 mounting a snap switch 410 and biased by means of a tension spring 411 toward an adjustable abutment 412. This abutment adjusts the position of the detector arm for whatever loading of the take-up reel is desired, such as 100 feet. Thereby, when the arm 407 is released from an inactivating retainer arm 413 by tripping of a detent 413a by closing of the door 372, its free end feeler portion will be disposed in position to engage the film roll in the outer of the take-up reels 297 when the roll attains the predetermined loading diameter. This will move the detector arm 407 in opposition to bias of the spring 411 and thus effect closing of the switch 410 to afford an alarm.

Coordinated with operation of the selective driving means is an exposure shutter assembly 414 (FIGS. 22, 24, 29, 31 and 32). This comprises a shutter mounting housing block 415 provided with a semi-cylindrical surface 416 opposing the film drums 294 in film-guiding relation. Through the surface 416 opens a horizontally elongated rearwardly diminishing exposure aperture slit 417 through which the lens assemblies 295 project onto the focal planes 264 and 265 by virtue of mounting of the housing 415 between the film drums 294 and the lenses. Mounting of the lens barrels is in a compact supporting body housing block or boss 418 which is integral with the rear and back walls of the camera box 267 and has optical image openings or bores 419 therethrough in which the barrels are threadedly engaged. The housing block 415 is adapted to be constructed as a molding or casting and is provided with attachment means comprising respective ear flanges 420 through which securing screws 421 extend into a supporting band 422 integral with the vertical side wall 267 of the camera box.

Shutter means for controlling the aperture slit 417 comprise in a simple, sturdy and practical construction a pair of coactive rotary meshing pinion wire shutter members 423 and 424 substantially complementally identical and received within respective opposed semi-circular shutter groove channel recesses 425 of closely complementary contour opening along their lengths in opposed relation into the aperture slit 417. These shutter housing recesses 425 are blind ended in the outer or free end portion of the housing member 415, with respective journal counterbores 427 within which short axial bearing extensions 428 on the adjacent ends of the shutter members 423 and 424 are rotatably engaged. At their opposite, inner ends the shutter recess grooves 425 are open ended through a boss 429 extending through a clearance aperture 430 in the inner vertical wall of the camera housing 267, whereby an inward pinion extension 431 on one of the shutter members, herein the member 424, extends beyond the plane of the external surface of such wall. A bearing for a journal 432 joining the pinion extension 431 to its shutter member, and for a pintle-like axial journal 433 on the companion shutter member, is provided by a bearing plate 434 set into the end of the boss 429.

By virtue of meshing interengagement of the pinion teeth of the shutter members 423 and 424, relative gear-like turning movements of the members is adapted to effect either closing of the photographing aperture 417 as shown in FIGURE 29, or opening of such aperture as shown in FIGURES 31 and 32. In the aperture opening relationship of the shutter members 423 and 424, respective equally longitudinally slabbed off chordal areas 435 thereon cooperate to provide, in opposition a shutter aperture substantially equal in length and width to the photographing aperture 417. As will be observed, beyond each end of each of the chordally recessed aperture areas 435, the shutter members 423 and 424 have full circle gear or pinion portions affording meshing pinion sections maintaining the shutter members in synchronism. By turning the shutter members 423 and 424 until the fully longitudinally running teeth adjacent to one side of the aperture faces 435 are in mesh, substantially as shown in FIGURE 29, thorough light blocking closure of the aperture 417 is effected.

Means for automatically opening and closing the shutter 414 synchronized with travel of documents through the scanning zone and driving of the film is effected by means comprising a rock lever arm 437 having a sector gear terminal 438 meshing with the pinion extension 431. A rocking pivot for the lever 437 is provided intermediately thereof by a stud 439 projecting from the camera box side wall (FIGS. 26, 29 and 31). Rocking of the lever 437 in one direction effects closing of the shutter 414 and rocking of the lever in the opposite direction effects opening of the shutter. Biasing means comprising a tension spring 440 normally maintains the rock lever 437 in the shutter closing position. Opening of the shutter is effected by energizing a solenoid 441 mounted on the camera box and which has its armature 442 attached to the rock lever 437 by means of a spring cushioned connector 443 opposing the biasing spring 440. As a result, in the non-photographing condition, the solenoid 441 is deenergized and the spring 440 rocks the sector lever arm 437 to close the shutter. On signal for photographing, the solenoid 441 snaps the shutter open.

Adjustable stop means define the shutter open and shutter closed limits of rocking movement of the sector lever 437. Such stop means herein comprise a reciprocably adjustable bar 444 secured to the camera box wall as by means of a screw 445 extending through an elongated slot 446. A stop lug 447 on the bar 444 extends through a slot 448 in a head 449 on the lever 437 and defining opposed spaced stop shoulders engageable with the stop lug 47 in the respective shutter open and shutter closed positions.

OPERATION RELATED TO THE ELECTRICAL CONTROL CIRCUIT

On reference to FIGURE 33, the control circuit for electrical operation of the machine is shown schematically and includes a suitable plug 450 and cable 451 by which the circuit is adapted to be connected into a suitable electrical power outlet. In FIGURE 33 all switches, relays and control devices are shown in the off position and with the camera 263 (assumed to be equipped for 44/1 reduction) properly placed, loaded with film and ready for operation. With the camera in this position, a normally closed interlock safety switch 452 (FIGS. 2, 22 and 33) is opened by the camera. An electrical receptacle 453 carried by the cabinet receives and effects electrical connections with multiple prongs on a plug 454 (FIGS. 26 and 33) carried by the camera. In respect to 44/1 and 32/1 reduction cameras, a jumper 455 is utilized.

For a 32/1 reduction camera, an additional jumper 457 is used. Both of the jumpers 455 and 457 are omitted in a 24/1 camera. With these connections properly made, the film loading switch 331, the film tension switch 353, the film take-up switch 410, the film supply switch 324 and the shutter solenoid 447 are operatively connected into the circuit.

To start operation of the machine, a power switch 458 (FIGS. 1, 3, 7 and 33) is actuated by a switch operating knob 459 conveniently located on the right front portion of the machine cabinet with suitable indicia to indicate an *off* position and two *on* positions. Closing of the power switch 458 by moving the knob 459 to one of the *on* positions energizes the drive motor 179, the motor of the fan 210, the illumination lamps 200 through the autotransformer 212 and a lamp failure relay 460. If all of the lamps are properly illuminated normally open contacts 460–1 and 460–2 remain open, but if any lamp fails, this relay closes such contacts whereby to energize an alarm buzzer 461 and a lamp failure signal lamp 462 visible through a window 463 (FIG. 1) on the control panel 140. At the same time, closing of the contact 460–2 energizes a holding relay 464 which closes a normally open contact 464–1 and opens a normally closed contact 464–2 in the circuit for the double document detector switch 120 and the feed clutch 141 to prevent feeding of documents. Also energized is a low voltage transformer 465 in which the various solenoids and related switches as well as the camera circuits are included.

Before sending documents to be photographed through the machine, safety leader on the supply roll of film must be run out, and again at the end of the film strip safety leader must be wound onto the take-up reel. Further, it is desirable to provide means for running the film to afford a gap when desired between batches of photographed documents. For this purpose a two-way control switch 467 is provided having an actuator 468 on the control panel 140. Leader run-out or take-up is initiated and then continues automatically by actuating the switch to close a contact 467a which closes a circuit through a relay 469 which closes normally open contacts 469–1 and 469–2. Thereby a space cycle relay 470 is energized to open a normally closed contact 470–1 to inactivate the alarm devices, opens a normally closed contact 470–2 to deactivate the double document detector and open the feed clutch 141, and closes a normally open contact 470–3 whereby the film drive solenoid 385 is energized. At the same time, a timer 471 is energized which operates after a predetermined delay sufficient for running of the leader to open a switch 471a and break the circuit to the holding relay 469 and thus reestablish the circuitry for normal operation.

For gapping of the film at will for indeterminate intervals, the switch 467 is actuated to complete a circuit across a contact 467b effecting energization of the space cycle relay 470 along and only as long as the circuit through the contact 467b is closed.

When the double document or thickness control detector 100 is desired to be operative, a control switch 472, operated through a knob 473 on the control panel 140, is actuated to energize the solenoid 116. This effects closing of the detector switch 120 in the manner previously described and closes the feed clutch 141. Also an indicator lamp 474 illuminates a panel 475 on one side of the switch actuator 473. Through this arrangement the lamp 474 remains on while the switch 120 remains closed.

When a double or overly thick document feed occurs, the lamp 474 flickers momentarily while the lower sheet is oscillating, and burns brightly when the sheet is cleared. The lamp 474 is also useful when setting the space between the rollers 103 and 107. By turning the adjustment knob 139, with a document between the detector rollers, the lamp 474 changes from a flickering condition to a brightly burning condition as the space is increased from less than one document thickness to more than one document thickness. A single document trying to pass through less than a document thickness space will oscillate forward and backward until the space has been opened to permit clear passage. Through this arrangement, control can be effected for various paper conditions including, in addition to thickness, the type of paper, condition of the paper, etc.

As each document reaches the scanning aperture 157, (FIG. 10) it trips a document detector and switch actuator 477 (FIGS. 10 and 14) to close a normally open switch 478 (FIGS. 2 and 33) which thereupon energizes the film drive solenoid 385 and simultaneously the camera shutter solenoid 447. The document detector is normally biased into switch opening position in the absence of a document to be photographed. Beyond the scanning aperture, each document is counted as it trips the normally open paddle wheel sensing switch 168 to pulse the counter 170.

In the event that any of the normally open film malfunction switches 324, 331, 353 or 410 closes, a film failure relay 479 is energized to close normally open contacts 479-1 to energize the holding relay 464, and to open a normally closed contact 479-2 in the lamp failure indicator circuit while closing normally open contacts 479-3 and 479-4 to close a circuit for a film failure indicator lamp 480. The buzzer 461 is also energized. Observation of the lamp 480 is through the control panel window 463. For attracting attention a flasher relay 481 is desirably connected in the lamp failure circuit to effect flashing of the failure indicator lamps 462 or 480, as the case may be.

Where the camera is equipped for 32/1 reduction only, so that the jumper 457 is employed, an indicator lamp 482 lights on the front of the panel 54 above the magazine 39.

As optional equipment, a suitable endorser may be attached to the machine and may include a sensing switch 483, a solenoid 484 and a power control switch 485. Connected into the circuit through suitable plug-in separable connector means 487.

If at any time it is desired to utilize the machine only for counting documents, and possibly endorsing and not photographing, the camera can be cut out while the remainder of the circuit remains active by turning the switch knob 459 to its other *on* position to disconnect the power switch 458 and connect a power switch 488. Thereupon, the document feed mechanism, the double document detector if desired and the counter remain active.

When a 24/1 camera is installed, neither of the jumpers 455 or 457 is used. Since this reduction ratio is for front only photographing, document feeding will proceed only when the flap shutter 233 is adjusted for front photographing, which causes the normally open switch 261 to be closed whereby to complete an energizing circuit through the feed clutch 141. Through this arrangement, assurance is afforded for proper adjustment of the shutter 233 consonant with requirements of the 24/1 camera.

In order to afford visual reference with respect to illumination control adjustments and performance, a voltmeter 489 (FIGS. 1, 1A, 1B and 33) is connected across the line of the circuit joining the auto-transformer 212 and the relay 460. Housed in a suitable casing, the voltmeter 489 is mounted on the instrument panel 140 adjacent to the illumination control knob 221. On its face the voltmeter unit has relatively adjustable scales comprising a film speed scale 490 and a document color factor scale 491. The scale 490 is calibrated and identified with respect to the speed of films in a range suitable for and likely to be used in this type of machine. On the scale 491 various calibrations and identification are provided with respect to document color from pure white to the darkest color that can be photographed. In this instance, the film speed scale 490 is provided on a face plate 492 over which an indicator pointer 493 of the voltmeter is movable.

For adjustably viewing the document color scale 491 through an arcuate window 494 in the dial plate 492 aligned with the calibrations of the film speed scale 490, a rotatably adjustable dial plate 495 is provided. Mounting of the plate 495 behind the plate 492 for rotary adjustment on an axis common with the pivotal axis of the needle 493 is effected by means comprising a pair of respective guide washers 497 secured in place by screws 498 and engaging in respective diametrically opposite arcuate guide slots 499 in the side portions of the plate 495 on a radius concentric with the needle pivotal axis. Through this arrangement, rotary adjustment of the color scale dial plate 495 by manipulation of a handle projection 500 thereon, accessible along the upper edge of the meter unit, is readily effected within the predetermined full range of adjustment movement permitted by the arcuate guide slots 499 and related to a centered control indicia such as an arrow 501 on the color scale area adapted to register selectively with the film speed scale 490 by suitable adjustment of the dial 495.

To maintain the adjustable dial 495 releasably in each of its selective positions of adjustment, detent means are provided, conveniently comprising a detent collar 502 mounted by means of a stud 503 on the color scale dial 492 and projecting into torque-yieldable detent engagement between suitably spaced shallow tooth-like detent projections 504 forming along a longitudinally arcuate edge defining an arcuate slot in the dial 495 midway between and on the same diameter as the guide slots 499. This enables the dial 495 to be easily and quickly set adjustably and the adjustment will remain fixed until the dial 495 is again manually adjusted.

Preparatory to operation of the machine, the document color scale dial 495 is adjusted to align the pointer 501 with the calibration on the film speed scale 490 corresponding to the known film speed in the camera 263 assembled in the machine. Then, assuming the power switch has been turned on through the knob 459, so that the auto-transformer 212 has been energized, adjustment manipulation of the illumination control knob 221 will be reflected by movement of the voltmeter needle 493 across the document color scale 491. By such adjustment the needle 493 is caused to align with the color code symbol on the scale 491 corresponding substantially to the color of the documents to be processed. Should there be a voltage fluctuation for any reason in the electrical current supply, which will be evidenced by corresponding fluctuation in the position of the needle 493, the operator on observing this can readily effect a readjustment by manipulation of the control knob 221. As a result, substantial uniformity of image density is attained and can be conveniently and quickly maintained throughout operation of the machine.

It will be understood that modifications and variations may be effected without departing from the scope of the novel concepts of the present invention.

We claim as our invention:

1. A microfilm recording machine comprising, in combination, a cabinet including an enclosing housing having a front portion provided with a lower feed-in entrance and and an upper discharge exit, magazine structure aligned with said entrance for documents to be microfilmed, document feed means in said entrance including
document pull-in means including a manually adjustable pressure regulating device,
a document feed roller drivingly coupled with said pull-in means,
a reversing roller opposing the feed roller and including means for manually selectively adjusting operative spacing between the rollers,
and a document thickness detector mounted in the path of documents passing the feed and reversing rollers including manually operable adjusting means and means for automatically controlling feed operations of the feed roller, document transport means within the cabinet between said feed means and exit and including an intermediate front and back document scanning zone, document illuminating means mounted adjacent to said scanning zone and including light intensity control means having a manual adjustment device and a visual index and meter located on the front of the machine, document hopper means aligned with said exit for receiving documents therefrom and including adjustable front stop means and pivotally mounted rear back stop means and adapted to be removed for access to said illuminating means, means within the cabinet defining a wrap-around optical track including document scanning mirror means associated with said zone and a series of reflecting mirrors directing front and back images of scanned documents horizontally toward the right and then downwardly and toward the left under the transport means to the left side of the cabinet within the housing and then forwardly, manually settable shutter means in said path for selectively blocking either the front or back images, a flow film camera unit and means in the left forward portion of the cabinet receptive of the camera unit in alignment with said forwardly projected document images, film driving means on the camera unit, power transmission means in the cabinet positioned to be automatically drivingly coupled with said film driving means incident to mounting of the camera unit in the cabinet, a driving motor mounted in the cabinet, means drivingly coupling the driving motor with said transmission means and said document transport means as well as said feed and reversing rollers, and electrical operating and control means for said motor, said document feed means, said illuminating means and said camera, and comprising control means mounted on the front of said cabinet.

2. A microfilm recording machine comprising, in combination, a cabinet including an enclosing housing having a front portion provided with a feed-in entrance and a discharge exit, magazine structure aligned with said entrance for documents to be microfilmed, document feed means in said entrance including
document pull-in means including a manually adjustable pressure regulating device,
a document feed roller drivingly coupled with said pull-in- means,
a reversing roller opposing the feed roller and including means for manually selectively adjusting operative spacing between the rollers,
and a document thickness detector mounted in the path of documents passing the feed and reversing rollers including manually operable adjusting means and means for automatically controlling operations of the feed roller, document transport means within the cabinet between said entrance and exit and providing a document scanning zone having document illuminating means, means within the cabinet defining an optical projection track including document scanning means associated with said zone, a camera unit mounted on the cabinet in alignment with said track, film driving means on the camera unit, and driving means in the cabinet including means for driving said driving means on the camera unit.

3. A microfilm recording machine comprising, in combination, a cabinet including an enclosing housing having a front portion provided with a feed-in entrance and a discharge exit, magazine structure aligned with said entrance for documents to be microfilmed, document feed means aligned with said entrance, document transport means within the cabinet between said feed means and exit and including an intermediate front and back document scanning zone with document illuminating means mounted adjacent thereto interiorly of the cabinet and adjacent to said exit, and document hopper means aligned with said exit for receiving documents therefrom and including adjustable front stop means and pivotally mounted rear back stop means providing at least in part a front closure on the cabinet relative to said illuminating means and adapted to be removed for access to said illuminating means.

4. A microfilm recording machine comprising, in combination, a cabinet including an enclosing housing having a front portion provided with a lower feed-in entrance and an upper discharge exit, magazine structure aligned with said entrance for documents to be microfilmed, document feed means aligned with said entrance, document transport means within the cabinet between said feed means and exit and providing an intermediate front and back document scanning zone with document illuminating means mounted adjacent thereto, document hopper means aligned with said exit for receiving documents therefrom, means within the cabinet defining a wrap-around optical track including a document scanning mirror means associated with zone and a series of reflecting mirrors directing front and back images of scanned documents horizontally toward the right and then downwardly and toward the left under the transport means to the left side of the cabinet within the housing and then projecting forwardly, a camera unit in the left side of the cabinet in alignment with said forwardly projected document images, and manually settable shutter means mounted in the cabinet in said optical track and before it reaches the camera for selectively blocking either the front or back images from reaching the camera.

5. In a machine of the character described, a document magazine, feed roller means, a rocker arm rockably mounted on an axis common to the feed roller means, a pulley rotatable on the rocker arm, a pull-in belt trained over the pulley and drivingly coupled wtih the feed roller means for advancing documents from the magazine to the feed roller means, a projection on said rocker arm, a biasing spring arm fixedly mounted and acting on said projection normally to lift said pulley and belt in pressure reducing direction, a pressure spring arm engaging said projection in opposition to said fixedly mounted spring arm, an adjustment lever mounting said pressure spring arm, means pivotally mounting said lever, an operating handle on said lever, and selective adjustment maintaining detent means affording a plurality of selective pressure determining settings of the lever.

6. In a machine of the character described, a document magazine, feed roller means, a rocker arm rockably mounted on an axis common to the feed roller means,
a pulley rotatable on the rocker arm,
a pull-in belt trained over the pulley and drivingly coupled with the feed roller means for advancing documents from the magazine to the feed roller means,
a projection on said rocker arm,
a biasing spring arm fixedly mounted and acting on said projection normally to lift said pulley and belt in pressure reducing direction,
a pressure spring arm engaging said projection in opposition to said fixedly mounted spring arm,
an adjustment lever mounting said pressure spring arm, and means for actuating said lever, 7. In a machine of the character described,
a document magazine,
feed roller means,
a rocker arm rockably mounted on an axis common to the feed roller means,
pull-in means carried by the rocker arm and drivingly coupled with the feed roller means for advancing documents from the magazine to the feed roller means,
biasing means acting on said arm normally to shift said pull-in means in pressure reducing direction,
biasing means acting on said arm in opposition to said first mentioned biasing means, and means for adjusting the bias of said last mentioned biasing means.

8. In a machine of the character described,
a document magazine,
feed roller means,
means for advancing documents from the magazine to the feed roller means,
and means for adjustably varying pressure of the advancing means against the documents in accordance with thickness of paper, type of paper, and condition of paper.

9. In a machine of the character described having a document magazine,
frictional pressure means for advancing documents succesively from the magazine,
opposed feed and reversing rollers receptive of advanced documents,
document thickness sensing means in the path of documents fed by the feed roller,
means for adjusting the pressure of said advancing means,
means for adjusting the spacing between said rollers,
means for adjusting said document thickness detecting means for variable document thicknesses,
and means operated by said detecting means for signalling the presence in said path of a document of greater thickness than that for which said adjustments have been made.

10. In a machine of the character described,
feed roller means including a forwardly feeding roller and an opposing reversing roller,
a rotary shaft mounting said reversing roller, arms having bearing end portions mounting said shaft,
means intermediately pivoting said arms comprising a supporting bracket and an arm mounting shaft carried by the bracket,
a mechanism plate pivotally mounted on said shaft between said arms,
means for adjusting said arms relatively or jointly pivotally about said arm mounting shaft to adjust the reversing roller relative to the forwardly feeding roller comprising laterally extending respective adjustment levers,
pivotally mounted on said plate and biasing means normally thrusting said arms toward said levers,
lever-adjusting manually operable wheels and a wheel shaft journalled on said plate,
means operatively connecting said wheels with said levers comprising threaded respective sleeves on the shaft coupled corotatively to the wheels,
respective motion transmission nuts running on the sleeves and engaged wtih the levers for translating rotary adjustment movement of the respective wheels into pivotal arm adjustment movement of the levers,
means for selectively securing the sleeves fixedly to the wheel shaft for joint rotary movement of the wheels,
indicia means carried by one of the wheels for visual guidance in the joint adjustment movements of the wheels,
stop means on said plate and one of said wheels for limiting the range of rotary adjustment of such wheel,
and means yieldably biasing said plate toward said bracket enabling manual pivoting of the plate to move the reversing roller away from the feeding roller.

11. In a machine of the character described,
feed roller means including a forwardly feeding roller and an opposing reversing roller,
a rotary shaft mounting said reversing roller,
arms having bearing end portions mounting said shaft,
means intermediately pivoting said arms comprising a supporting bracket and an arm mounting shaft carried by the bracket,
a mechanism plate mounted between said arms,
means for adjusting said arms relatively or jointly pivotally about said arm mounting shaft to adjust the reversing roller relative to the forwardly feeding roller and comprising laterally extending respective adjustment levers pivotally mounted on said plate and biasing means normally thrusting said arms toward said levers,
lever-adjusting manually operable wheels and a wheel shaft journalled on said plate,
means operatively connecting said wheels with said levers comprising threaded respective sleeves on the shaft coupled corotatively to the wheels,
respective motion transmission nuts running on the sleeves and engaged with the levers for translating rotary adjustment movement of the respective wheels into pivotal arm adjusting movement of the levers,
and means for selectively securing the sleeves fixedly to the wheel shaft for joint rotary movement of the wheels.

12. In a machine of the character described,
feed roller means including a forwardly feeding roller and an opposing reversing roller,
a rotary shaft mounting said reversing roller,
arms having bearing end portions mounting said shaft,
means intermediately pivoting said arms,
and means for adjusting said arms relatively or jointly pivotally about said arm mounting shaft to adjust the reversing roller relative to the forwardly feeding roller.

13. In a machine of the character described,
a magazine platform for documents to be fed,
a feed roller assembly for feeding documents successively from the platform and including opposed upper and lower roller means,
means supporting said lower roller means comprising a carriage assembly,
means rockably mounting said carriage assembly for movement of said lower roller means toward and away from said upper roller means,
means normally biasing the carriage to direct the lower roller means toward the upper roller means,
means on said carriage assembly for adjusting said lower roller means relative to the carriage and said upper roller means,
and means accessible below said platform for operating said adjusting means.

14. In a machine of the character described,
a magazine for documents to be fed, a feed roller assembly for feeding documents successively from the magazine and including opposed upper and lower roller means,
means supporting said lower roller means comprising a carriage assembly,
means rockably mounting said carriage assembly for movement of said lower roller means toward and away from said upper roller means,
means normally biasing the carriage to direct the lower roller means toward the upper roller means,
and means on such carriage assembly for adjusting said lower roller means relative to the upper roller means.

15. In a machine of the character described,
a feed roller assembly for feeding documents successively from a supply and including opposed upper and lower roller means,
shaft means supporting said lower roller means,
means adjustably supporting said shaft means,
and means for adjusting said shaft supporting means for canting or uniformly transversely displacing the shaft means and thereby the lower roller means relative to the upper roller means.

16. In a machine of the character described,
means for feeding documents along a path and including an electrically operated clutch,
and a double document detector comprising
 a fixed position document engaging idler roller on one side of said path,
 a document engaging detector roller on the other side of said path opposing said idler roller,
 a bell crank supporting said detector roller,
 means mounting the bell crank rockably for normally maintaining the detector roller out of document contacting position,
 means for rocking said bell crank lever to move said detector roller into document engaging position and including a solenoid having an armature and means connecting it to said bell crank lever,
 means rockably supporting the solenoid,
 means for adjusting the solenoid supporting means for thereby adjusting the document spacing between said rollers and including
  a thrust surface on said supporting means,
  and a conical adjusting cam,
 means mounting the adjusting cam for axial adjusting movement,
 means biasing said solenoid supporting means toward and to effect engagement of said thrust surface against the cam,
 manually operable means coupled with said cam mounting means for adjustably actuating the same,
 an electrical switch in a control circuit for said clutch and carried by said solenoid supporting means and having actuating means operable by said bell crank lever when actuated by said solenoid to move toward said actuating means,
 and yieldable biasing means in said connecting means and enabling separating movement of the bell crank lever relative to the armature and said supporting means and said switch in response to document actuation of the detector roller.

17. In a machine of the character described,
means for feeding documents along a path and including an electrically operated clutch,
and a double document detector comprising
 a fixed position document engaging idler roller on one side of said path,
 a document engaging detector roller on the other side of said path opposing said idler roller,
 a bell crank supporting said detector roller,
 means mounting the bell crank rockably for normally maintaining the detector roller out of document contacting position,
 means for rocking said bell crank lever to move said detector roller into document engaging position and including a solenoid having an armature and means connecting it to said bell crank lever,
 means rockably supporting the solenoid,
 means for adjusting the solenoid supporting means for thereby adjusting the document spacing between said rollers and including
  a thrust surface on said supporting means,
  and a conical adjusting cam,
 means mounting the adjusting cam for axial adjusting movement,
 means biasing said solenoid supporting means toward and to effect engagement of said thrust surface against the cam,
 manually operable means coupled with said cam mounting means for adjustably actuating the same,
 and an electrical switch in a control circuit for said clutch and carried by said solenoid supporting means and having actuating means operable by said bell crank lever when actuated by said solenoid to move toward said actuating means.

18. In a machine of the character described,
means for feeding documents along a path and including an electrically operated clutch,
and a double document detector comprising
 a fixed position document engaging idler roller on one side of said path,
 a document engaging detector roller on the other side of said path opposing said idler roller,
 a bell crank supporting said detector roller,
 means mounting the bell crank rockably for normally maintaining the detector roller out of document contacting position,
 means for rocking said bell crank lever to move said detector roller into document engaging position and including a solenoid having an armature and means connecting it to said bell crank lever,
 and an electrical switch in a control circuit for said clutch and having actuating means operable by said bell crank lever when actuated by said solenoid to move toward said actuating means.

19. In a machine of the character described,
means for feeding documents along a path and including an electrically operated clutch,
and a double document detector comprising
 a fixed position document engaging idler roller on one side of said path,
 a document engaging detector roller on the other side of said path opposing said idler roller,
 means supporting said detector roller for normally maintaining the detector roller out of document contacting position,
 means for selectively operating said supporting means to move said detector roller into document engaging position,
 an electrical switch in a control circuit for said clutch and having means closed by said supporting means in the document engaging position of the detector roller,
 means for adjusting the supporting means to determine the document thickness spacing of the detector roller relative to said idler roller,
 means biasing said solenoid mounting means toward the cam,
 manually operable means coupled with said cam for adjustably actuating the cam, and yieldable biasing means connecting said armature and said bell crank lever and enabling switch opening movement of the bell crank lever relative to the armature in response to document actuation of the roller.

20. In a machine of the character described, means for feeding documents along a path and including an electrically operated clutch, and a double document detector comprising
    a fixed position document engaging idler roller on one side of said path,
    a document engaging detector roller on the other side of said path opposing said idler roller,
    a bell crank supporting said detector roller,
    means mounting the bell crank rockably for normally maintaining the detector roller out of document contacting position,
    means for rocking said bell crank lever to move said detector roller into document engaging position and including a solenoid having an armature and means connecting it to said bell crank lever,
    means for adjusting the spacing between said rollers and including a thrust surface,
    a conical adjusting cam,
    and manually operable means coupled with said cam for adjustably actuating the cam.

21. In a machine of the character described including a cabinet having a document magazine and feed structure for feeding documents in a predetermined path,
    a control panel on the cabinet adjacent to said magazine and feed structure,
    a document thickness detector assembly mounted in said path and having a fixedly mounted element and a rockably mounted opposed document-engaging roller and feed structure controlling means,
    means for adjusting the document spacing between said element and said roller including
        a threaded shaft having an adjustment cam for controlling said spacing,
        means threadedly supporting said shaft, and a rotary driving extension slip coupled with the shaft and carrying a pulley,
    an adjustment knob on said panel,
    and a flexible transmission element operatively connecting said pulley with said knob to effect adjustment rotation of said extension and rotary shaft.

22. In a machine of the character described including a cabinet having a document magazine and feed structure for feeding documents in a predetermined path,
    a double document detector assembly operatively mounted in said path and having opposed detector elements,
    means for adjusting the spacing between said detector elements,
    and means on said cabinet for operating said adjusting means.

23. In a microfilm recorder including a cabinet providing document magazine and feeding and transport means,
    document scanning means associated with the transport means,
    document illuminating means including respective banks of lamps for respectively illuminating front and back sides of the documents,
    housings supporting the respective banks of lamps,
    means pivotally mounting the housings comprising spaced side frame members,
    overcenter snap springs connected to the housings and to at least one of said frame members and operative to maintain the lamp housings in either illuminating position or a rotated respective lamp servicing position,
    and respective access means on said cabinet openable for exposing the respective lamp housings for servicing.

24. In a microfilm recorder including a cabinet providing document magazine and feeding and transport means,
    document scanning means associated with the transport means,
    document illuminating means including a bank of lamps for illuminating the documents,
    a housing supporting the scanning lamps, means pivotally mounting the housing in the cabinet,
    overcenter snap spring means connected to the housing and to the cabinet and operative to maintain the lamp housing in either illumination position or a rotated lamp servicing position.

25. In a microfilm recording machine including a cabinet providing a housing and having document feed and transport means affording a document scanning zone,
    electrically operated document illuminating means associated with said scanning zone,
    adjustable transformer means in a remote location relative to the illuminating means for controlling the intensity of illumination of said illuminating means and including a rotary shaft,
    an adjustment knob on said cabinet at a remote location relative to both said transformer means and said illuminating means,
    and flexible transmission means connecting said knob with said shaft for adjusting the transformer by turning of said knob to actuate the transmission means to rotate the shaft.

26. In a microfilm recording machine including a cabinet providing a housing and having document feed and transport means affording a document scanning zone,
    electrically operated document illuminating means associated with said scanning zone,
    adjustable transformer means for controlling the intensity of illumination of said illuminating means,
    means for adjusting said transformer means including a knob on said cabinet,
    and lamp failure warning means including a warning lamp carried by said knob.

27. In a microfilm recording machine having a document scanning zone and transport means to carry documents through said zone,
    an electrically operated document illuminating means associated with said scanning zone,
    an electrical circuit for said illuminating means including an adjustable transformed for controlling electrical current to vary the intensity of illumination of the illuminating means for obtaining uniformity of microfilming results with variable document reflectance,
    means for adjusting said transformer,
    and a voltmeter in said circuit operative to show the line voltage condition of the circuit and including
        a pivotally swingable indicator needle,
        a film speed scale,
        a document color scale operatively associated with the film speed scale,
        both of said scales being positoined to be swept by said needle,
    and means for relatively adjusting said scales.

28. In a microfilm recording machine having a document scanning zone and transport means to carry documents through said zone,
    an electrically operated document illuminating means associated with said scanning zone,
    an electrical circuit for said illuminating means including an adjustable transformer for controlling electrical current to vary the intensity of illumination of the illuminating means for obtaining uniformity of microfilming results with variable document reflectance,
    means for adjusting said transformer, and a voltmeter in said circuit operative to show the
line voltage condition of the circuit and including
  a film speed dial having a scale thereon,
  a document color dial having a scale thereon,
  said dials being operatively corelated and the
    scales being in positon to be swept by said
    needle,
  and means for relatively adjusting the dials.
29. In a microfilm recording machine,
means providing a document transport affording a scanning zone,
document scanning and image reduction optical means
  including means for scanning and optically transmitting images from both the front and rear faces of
  documents transported through the scanning zone,
means comprising a shutter mounted adjacent to and
  on a pivotal axis parallel with said optical path and
  having respective shutter flap flanges operative alternately for blocking the front or rear images in said
  path,
and means for adjusting said shutter rotatably between
  a neutral position in which neither of said flanges
  is in blocking relation and into either of said image
  blocking relationships comprising
    a pulley corotative with said shutter,
    an operating knob mounted on said cabinet and
      having a shaft with a pulley corotative thereon,
    and a flexible transmission element operatively
      coupling said pulleys so that by turning said
      knob said shutter can be adjusted,
and pressure separable detent means maintaining
  the shutter in any of the neutral or respective image
  blocking adjusted positoins thereof.
30. In a microfilm recording machine,
means providing a document transport affording a scanning zone,
document scanning and image reduction optical means
  including means for scanning and optically transmitting images from both the front and rear faces of
  documents transported through the scanning zone,
means comprising a shutter mounted adjacent to and
  on a pivotal axis parallel with said optical path and
  having respective shutter flap flanges operative alternately for blocking the front or rear images in said
  path,
means for adjusting said shutter rotatably between a
  neutral position in which neither of said flanges is in
  blocking relation and into either of said image blocking relationships,
and pressure separable detent means maintaining the
  shutter in any of the neutral or respective image
  blocking adjusted positions thereof.
31. In a microfilm recording machine,
means providing a document transport affording a scanning zone,
document scanning and image reduction optical means
  including means for scanning and optically transmitting images from both the front and rear faces of
  documents transported through the scanning zone,
means comprising a shutter mounted adjacent to and
  on a pivotal axis parallel with said optical path and
  having respective shutter flap flanges operative alternately for blocking the front or rear images in said
  path,
and means for adjusting said shutter rotatably between
  a neutral position in which neither of said flanges is
  in blocking relation and into either of said image
  blocking relationships.
32. In a microfilm recording machine,
means providing document feed and transport means
  affording a scanning zone,
document scanning and image reduction optical means
  including means for scanning and optically transmitting images from both the front and rear faces of
  documents transported through the scanning zone,
means comprising a flap shutter mounted adjacent to
  and on a pivotal axis parallel with said optical path
  and having respective shutter flap flanges operative
  alternately for blocking the front or rear images in
  said path,
means for adjusting said shutter rotatably between a
  neutral position in which neither of said flanges is
  in blocking relation and into alternate image blocking position,
electrical control means for said document feed means
  including a switch mounted adjacent to said shutter,
and means on said shutter for actuating said switch in
  one of said positions.
33. In a document microfilming machine
a cabinet having opposite sides and a front and a lower
  portion and comprising, in combination,
a frame including spaced parallel coextensive side
  plates having tie bars securing them in a rigid assembly and housing means carried by the frame,
document magazine and document receiving hopper
  structures mounted in stepped relation between front
  portions of said frame plates,
document feed and transport means within the housing
  and supported between said frame plates and providing a document path and scanning zone between
  said magazine and hopper structures,
one of said plates and said housing means defining
  an optical path tunnel leading from said transport
  means horizontally and then downwardly and then
  horizontally in reverse through the lower portion of
  the housing,
the other of said plates and the housing means defining an extension of said tunnel,
illuminating and optical means for scanning documents
  in said zone and directing images of the documents
  through said tunnel including said extension,
a microfilm camera unit,
said other plate and said housing means defining a
  camera receiving recess opening toward the front of
  the cabinet,
means on said camera unit and on said other plate
  and said housing means for removably supporting
  said camera unit in said recess in photographic alignment with said tunnel extension,
photographing mechanism in the camera unit,
and means in the cabinet and in the camera unit for
  driving said mechanism and said document feeding
  and transport means synchronously.
34. In a microfilming machine including means for
scanning documents and projecting reduced images of
the document for photographing,
  a cabinet having at one side thereof a camera receiving
    recess opening forwardly and sidewardly,
  a camera unit having manipulating means comprising
    a front handle structure and including a camera box
    with outer side opening closure means,
  and means for guiding and retaining the camera in
    mounted position comprising coacting rail and track
    structure on the cabinet and on the camera unit
    running in a front to rear direction so that the camera unit is moved into operative position in the
    cabinet or removed by manipulation of said handle
    structure,
  and means for stabilizing the camera unit when fully
    mounted.
35. In a microfilming machine including means for
scanning documents and projecting reduced images of the
document for photographing,
  a cabinet having at one side thereof a camera receiving recess opening forwardly and sidewardly,
  a camera unit having manipulating means comprising
    a front handle structure and including a camera box
    with outer side opening closure means,
  and means for guiding and retaining the camera in
    mounted position comprising coacting rail and track structure on the cabinet and on the camera unit running in a front to rear direction so that the camera unit is moved into operative position in the cabinet or removed by manipulation of said handle structure, means for stabilizing the camera unit when fully mounted, and latch means for holding the camera against unintentional withdrawal from said recess.

36. In a document microfilming machine, a cabinet having document transport means and associated therewith a document scanning zone and scanning means for projecting document images for microfilming, means on one side of said cabinet providing a forwardly and sidewardly opening camera recess, said scanning and projecting means directing the document images forwardly into said recess, a camera unit including
    a camera box having an outer side opening outwardly and provided with openable closure means,
    a wall defining the opposite side of said box,
    film handling mechanism in said camera box and having driving means including mechanism on outer side of said wall,
    a casing enclosing said driving mechanism and attached to the camera box,
    a combination handle and casing structure mounted on the front of said camera box and over the front of said casing,
    and means oriented rearwardly from within the camera box and including lens means receptive of said forwardly directed images for focusing the images onto film carried by the handling mechanism, means on the cabinet and on the camera unit cooperative for removably supporting the camera unit in said recess with said casing structure and said outer side of the camera box lying substantially flush with contiguous portions of the cabinet, powered driving means in the cabinet for said document transport means and for the camera, and means on said driving mechanism of the camera unit coactive with said powered driving means for actuation of said film handling mechanism driving means in the assembled relationship of the camera unit in said recess.

37. In a document microfilming machine, a cabinet having document transport means and associated therewith a document scanning zone and scanning means for projecting document images for microfilming, means on one side of said cabinet providing a forwardly and sidewardly opening camera recess, said scanning and projecting means directing the document images into said recess, a camera unit including
    a camera box having an outer side opening outwardly and provided with openable closure means,
    film handling mechanism in said camera box,
    a combination handle and casing structure on the front of said camera box,
    and means within the camera box and including lens means receptive of said images for focusing the images onto film carried by the handling mechanism, means on the cabinet and on the camera unit cooperative for removably supporting the camera unit in said recess with said casing structure and said outer side of the camera box lying substantially flush with contiguous portions of the cabinet so as to blend smoothly with and in effect become part of the external contours of the cabinet, and said closure means being accessible without removing the camera from the recess.

38. A document microfilming machine comprising a cabinet and a removable camera unit supported by the cabinet, document transport means in said cabinet, means for scanning documents carried by the transport means and projecting images thereof to the camera unit, image focusing means in the camera unit aligned with the projecting means, film handling means in the camera unit for moving film past the focusing means, means within the cabinet for driving said transport means and for powering said film handling means, means providing a disconnectable driving coupling between said driving means and said film handling means and including a clutch assembly partly in the camera unit and partly in the cabinet and including a movable member in the cabinet having a solenoid actuated operator, shutter means in the camera unit including a solenoid operator, and means controlled by documents carried by said transport means for controlling both of said solenoid operators in unison.

39. A document microfilming machine comprising a cabinet and a removable camera unit supported by the cabinet, document transport means in said cabinet, means for scanning documents carried by the transport means and projecting images thereof to the camera unit, image focusing means in the camera unit aligned with the projecting means, film handling means in the camera unit for moving film past the focusing means, means within the cabinet for driving said transport means and for powering said film handling means, means providing a disconnectable driving coupling between said driving means and said film handling means and including a clutch assembly comprising a friction wheel carried by the camera unit and a cooperative friction wheel carried by the cabinet, and means controlled by documents carried by said transport means for controlling engagement between said friction wheels of said clutch assembly.

40. In a document microfilming machine including a cabinet provided with document transport and image scanning and projection means and a camera unit removably supported by the cabinet and having film handling means for moving microfilm past focusing means aligned with the projection means, means carried by the camera unit for driving the film handling means and including a pair of shafts spaced apart with respective pulleys thereon having a transmission belt trained thereover and determining the image reduction ratio film speed movement by said film handling means, one of said shafts having a driving friction wheel thereon, driving means within the cabinet including a friction driving wheel peripherally aligned in spaced relation with said driving wheel, and a movably mounted friction transmission wheel carried by the cabinet and having means for selectively moving it between inactive and active driving transmission relation to said spaced friction wheels.

41. For use in a document microfilming machine, a camera unit including casing structure having film handling means therein and means for driving the film handling means including a power wheel having a frictional perimeter and exposed with respect to the casing, said power wheel perimeter being engageable with frictional driving means mounted in a machine cabinet.

42. In a microfilm camera unit including film handling reel spindle means and film drum means,
mechanism for driving the drum means comprising a worm gear,
a worm meshing with said gear and having a shaft,
a pulley mounted on said shaft,
a second shaft spaced from said worm shaft and having a pulley mounted thereon,
a drive belt engaged about said pulleys,
said pulleys determining the image reduction ratio speed for said drum means,
means for driving said reel spindle means,
and means coupling said gear with said driving means.

43. In a microfilm camera including a camera box having a supporting wall,
a duel reel spindle structure supported by the wall and comprising a first tubular spindle section having a tubular shaft journalled in said wall and a second spindle section having a shaft journalled through said first spindle section and the tubular shaft,
and means on said shafts maintaining them in predetermined alignment.

44. A camera as defined in claim 43, wherein said means comprise slip clutch structure enabling relative rotary movement of the spindle sections.

45. A camera as defined in claim 43, wherein said means comprise respective driving gears, means carried by the camera box wall comprising power transmission gears on a common driving shaft and respectively meshing with said driving gears, and slip clutch connections between said transmission gears and said common driving shaft.

46. In a microfilm camera unit,
a camera box having therein a film compartment provided with a film reel spindle,
said compartment being open toward one side and having a door for closing the same,
an arm pivotally mounted in said compartment and having means thereon for engagement with the perimeter of a roll of film on a reel on said spindle,
detent means for holding said arm in a disabled spaced relation to the reel,
and means on said door operable to release the arm from said detent means when the door is closed.

47. A microfilm camera unit including a film compartment having a film reel support therein,
a film follower member in said compartment and including an arm to swing in an arc as the follower rides a diminishing roll of film on a reel on said support,
means normally biasing the follower toward the roll of film,
a film footage supply indicator wheel,
means normally biasing said wheel toward a starting position,
a reel on said wheel having an actuating flexible element wound thereon and attached thereto at one end with the opposite end of the flexible element coupled to said arm,
whereby as said arm swings with the follower on a diminishing roll of film the flexible element rotates the reel and footage indicator wheel from said starting position.

48. In a microfilm camera construction,
a camera housing having film handling means therein including an idler capstan having a shaft including a pulley thereon,
a film frame meter mounted on said housing at a remote distance from said pulley,
and a flexible transmission member running over said pulley and operatively engaging with said meter.

49. In a microfilm camera construction,
means defining a focal plane,
means within the camera providing support for two film supply reels,
means for supporting two take-up reels,
means for guiding film between the supply and take-up reels through said focal plane,
a pair of film tension detector arms mounting idler rollers and supported relatively rotatably on a common axis,
respective switch actuating levers mounted rockably with said tension detecting arms,
a switch having a single actuating element engageable by both of said levers,
means normally biasing said levers into switch actuating engagement with said element,
said levers being moved away from said element by film tension acting on said rollers,
and rotatably adjustable means for selectively holding one of said arms and its lever disabled relative to said element.

50. In a microfilm flow camera construction,
means providing film supply and take-up means and means for guiding the film through a focal plane,
a housing opposing such focal plane and having a slit aperture therethrough for image-focusing onto said focal plane,
a pair of pinion wire shutter members mounted in said housing in intermeshing relation across said aperture,
said shutter members having chordally slabbed off shutter aperture faces,
and means for actuating said shutter members rotatably between a limit wherein said faces are in opposed aperture-forming relation to provide a shutter aperture registering with said housing aperture and a second limit wherein said faces are angularly related to one another and the shutter members completely block said housing aperture.

51. A camera as defined in claim 50, wherein said actuating means comprise a pinion on one of said shutter members, and a sector gear lever pivotally mounted and meshing with said pinion.

52. In a micro flow film camera,
a shutter construction comprising a housing block having an elongated slit aperture,
semi-circular grooves in said housing block at least as long as said aperture and opening in confronting relation to one another into said aperture,
a pair of gear synchronized elongated shutter members respectively mounted in said grooves and having respective and cooperating aperture-forming surfaces thereon,
and means for driving said shutter members rotatably in said grooves between housing aperture blocking and opening positions.

53. In a flow film microfilm camera construction,
a housing block having a horizontally elongated concave surface for opposing in closely adjacent relation a microfilm drum,
said housing block having a slit aperture through said surface for image focusing on an associated drum,
shutter recesses in said block on opposite sides of and opening into said aperture,
and a pair of coactive rotary shutter members respectively in said recesses and operative for selectively closing and opening said aperture.

54. In a microfilming machine including a cabinet having means therein for feeding documents,
document scanning and image projection means,
a camera receptive of the projected document images and having film handling means therein including a film supply compartment,
electrical means for controlling said document feeding means, and control means for said electrical means including a switch, and means positioned in said compartment and responsive only to improperly loaded film in said compartment for actuating said switch to operate said controlling means for halting the feeding means.

55. A document microfilming machine including document feeding means, electrically responsive means for controlling operation of said feeding means, means for scanning and projecting images of documents fed by the feeding means, a camera receptive of the projected document images and including film handling means, means in said camera for detecting various film failures and comprising electrical switches connected with said control means, and visual signal means on said cabinet activated in response to operation of the film failure detecting means.

56. A document microfilming machine comprising, in combination, a cabinet having means for feeding documents and associated therewith documents scanning and image projection means, means comprising an electrical control for controlling operations of the feeding means, means for controlling projection of images from either or both sides of documents, means for supporting a microfilm camera removably on the cabinet in alignment with the image projection means, and means for determining the presence in the camera supporting means of any one or any of three reduction ratio camera capabilities including a switch for controlling a circuit to the feed control means and required to be closed only in the presence of a camera having a certain of said capabilities, an electrical by-pass operative around said switch in the presence of cameras having either of the remaining capabilities, and a signal operative only in the presence of a camera having one of said remaining capabilities.

57. In combination in a microfilm recorder, means for feeding and transporting documents, means for scanning the documents and projecting images thereof, camera means for receiving the projected images, electrically controled means for driving said feeding means, electrically controlled means for driving the camera, an electrically pulsed document counter, first power switch means controlling the document feed driving means as well as the camera driving means and the counter in coordinated relation to one another, and second power switch means operable alternatively to the first power switch means and operative to effect coordinated operation of the feed driving means and the counter while disconnecting the camera driving means.

58. In a document microfilming machine including a cabinet and a camera, means for feeding documents, means for scanning the documents and directing images thereof to the camera, film handling means in the camera, means for driving the film handling means in the camera, electrical means for controlling the document feeding means and the film handling driving means, electrical control circuitry connecting said control means, said circuitry including a normally open double acting switch and relays including a space cycle relay energized in one closed position of the switch for manually determined running of the film handling means of the camera while disconnecting the feeding means, and a holding relay and a timer energized in the second closed position of the switch operative to control the space cycle relay for predetermined time interval for leadering operation of the film handling means.

References Cited
UNITED STATES PATENTS

| | | | |
|---|---|---|---|
| 2,472,931 | 6/1949 | Yohn | 88—24 |
| 2,552,266 | 5/1951 | Egan et al. | 88—24 |
| 2,557,026 | 6/1951 | Budde | 88—24 |
| 2,565,074 | 8/1951 | Halahan et al. | 88—24 |
| 2,984,150 | 5/1961 | Osgood | 88—24 |

NORTON ANSHER, *Primary Examiner.*

R. A. WINTERCORN, *Assistant Examiner.*